(12) United States Patent
Zhao et al.

(10) Patent No.: US 10,698,372 B2
(45) Date of Patent: Jun. 30, 2020

(54) COMPUTER SYSTEM AND METHOD FOR BUILDING AND DEPLOYING PREDICTIVE INFERENTIAL MODELS ONLINE TO PREDICT BEHAVIOR OF INDUSTRIAL PROCESSES

(71) Applicant: Aspen Technology, Inc., Bedford, MA (US)

(72) Inventors: Hong Zhao, Sugar Land, TX (US);
Ashok Rao, Sugar Land, TX (US);
Lucas L. G. Reis, Rosharon, TX (US);
Magiel J. Harmse, Houston, TX (US)

(73) Assignee: Aspen Technology, Inc., Bedford, MA (US)

( * ) Notice: Subject to any disclaimer, the term of this patent is extended or adjusted under 35 U.S.C. 154(b) by 110 days.

(21) Appl. No.: 15/995,753

(22) Filed: Jun. 1, 2018

(65) Prior Publication Data

US 2018/0348717 A1    Dec. 6, 2018

Related U.S. Application Data

(60) Provisional application No. 62/514,537, filed on Jun. 2, 2017.

(51) Int. Cl.
*G05B 13/04* (2006.01)
*G05B 17/02* (2006.01)
(Continued)

(52) U.S. Cl.
CPC ........... *G05B 13/048* (2013.01); *G05B 17/02* (2013.01); *G06F 3/0486* (2013.01); *G06N 5/02* (2013.01);
(Continued)

(58) Field of Classification Search
CPC .. G05B 13/048; G06Q 10/06393; G06N 5/04; G06N 5/02; G06F 3/0486
See application file for complete search history.

(56) References Cited

U.S. PATENT DOCUMENTS 6,594,620 B1 *   7/2003   Qin .......................... G05B 9/02
                                                           702/183
8,560,092 B2    10/2013   Zheng et al.
(Continued)

OTHER PUBLICATIONS

Hotelling T2 based variable selection in partial least squares regression. [online]. Tahir Mehmood. [retrieved on Oct. 21, 2019]. Retrieved from internet: <URL: http://dx.doi.org/10.1016/j.chemolab.2016.03.001> (Year: 2016).*
(Continued)

*Primary Examiner* — Robert E Fennema
*Assistant Examiner* — Marzia T Monty
(74) *Attorney, Agent, or Firm* — Hamilton, Brook, Smith & Reynolds, P.C.

(57) ABSTRACT

Embodiments are directed to systems that build and deploy inferential models for generating predictions of a plant process. The systems select input variables and an output variable for the plant process. The systems load continuous measurements for the selected input variables. For the selected output variable, the systems load measurements of type: continuous from the subject plant process, intermittent from an online analyzer, or intermittent from lab data. If continuous or analyzer measurements are loaded, the systems build a FIR model with a subspace ID technique using continuous output measurements. From intermittent analyzer measurements, the systems generate continuous output measurements using interpolation. If lab data is loaded, the systems build a hybrid FIR model with subspace ID and PLS techniques, using continuous measurements of a reference variable correlated to the selected output variable. The
(Continued)

systems deploy the built model to generate continuous key performance indicators for predicting the plant process.

19 Claims, 18 Drawing Sheets

(51) Int. Cl.
| | |
|---|---|
| *G06F 3/0486* | (2013.01) |
| *G06N 5/02* | (2006.01) |
| *G06N 5/04* | (2006.01) |
| *G06Q 10/06* | (2012.01) |

(52) U.S. Cl.
CPC ......... *G06N 5/04* (2013.01); *G06Q 10/06393* (2013.01)

(56) References Cited

U.S. PATENT DOCUMENTS

| | | |
|---|---|---|
| 9,141,911 B2 | 9/2015 | Zhao et al. |
| 9,727,035 B2 | 8/2017 | Keenan et al. |
| 2007/0165031 A1* | 7/2007 | Gilbert ............. G05B 19/41885 345/473 |
| 2013/0246316 A1 | 9/2013 | Zhao |
| 2014/0309756 A1 | 10/2014 | Trygstad |
| 2015/0324329 A1* | 11/2015 | Blevins ................. G05B 17/02 703/2 |
| 2016/0320768 A1 | 11/2016 | Zhao |

OTHER PUBLICATIONS

International Search Report and Written Opinion for PCT/US2018/035611 dated Aug. 24, 2018 entitled "Computer System and Method for Building and Deploying Predictive Inferential Models Online.".

Zhao, H., et al., "Improved closed-loop subspace identification technology for adaptive modeling and APC sustained value", AIChE Spring Meeting, Apr. 1-5, 2012, Houston, Texas, 2012.

Schaper, C.D., et al., "Identification of Chemical Processes using Canonical Variate Analysis", Computers & Chemical Engineering, vol. 18, No. 1, pp. 55-69, 1994.

Ljung, L., "System Identification: Theory for the User", 2nd Edition, Prentice Hall PTR, Chap.10.6-10.8, pp. 340-353, 1999.

Larimore, W., "Canonical variate analysis in identification, filtering, and adaptive control", Decision and Control, Proceedings of the 29th IEEE Conference, 1991.

Notification Concerning Transmittal of International Preliminary Report on Patentability, PCT/US2018/035611, "Computer System and Method for Building and Deploying Predictive Inferential Models Online ," dated Dec. 3, 2019.

* cited by examiner

SELECTING TAGS FROM GRAPHIC FLOWSHEET / TAG LIST TABLES TO CONFIGURE 202

Build | Tag Selection
Name: C25_Test
Browse for Graphic... or Search for tags...    310
Add tags listed below as candidate tags
☐ Show as tag list C2 Splitter Column PD-8701 [2] Bar FEED
Feed stream pressure [9] Bar
TI-8701 [-54] C
FI-8701 [105863] Kg/hr
PI-8706 [9] Bar PC-8901A [8] Bar → B2 → VAPOR
TI-8702A [-61] C
LC-8901   FI-8916A [10435] Kg/hr
PC-8901B [8] Bar   FI-8912 → B1 → TOP LIQUID [80005] Kg/hr
TI-8702B [-60] C
FI-8818 [105697]
TI-8705 [-58] C
TI-8704 [-56] C
TI-8703 [-48] C
T-C2C28
TI-8706 [-36] C
LC-8902   FU-8610 [19695] Kg/hr → B26 → BOTTOMS
305

Description: Enter a description for empirical model
316 317 318
Add/Candidate Tag/s List

| Input | Output | Tag Name↑↓ | Data Source↑↓ | Map |
|---|---|---|---|---|
| ☐ | ○ | V01-FO-8010 | AAVMVP3 | IP_AnalogMap |
| ☐ | ○ | V01-PC-8901A | AAVMVP3 | IP_AnalogMap |
| ☐ | ○ | V01-PC-8901B | AAVMVP3 | IP_AnalogMap |
| ☐ | ○ | V01-PD-8701 | AAVMVP3 | IP_AnalogMap |
| ☑ | ○ | V01-FI-8701 | AAVMVP3 | IP_AnalogMap |
| ☐ | ⊘ | V01-PI-8706 | AAVMVP3 | IP_AnalogMap |
| ☐ | ○ | V01-TI-8701 | AAVMVP3 | IP_AnalogMap |
| ☐ | ○ | V01-TI-8702A | AAVMVP3 | IP_AnalogMap |
| ☐ | ○ | V01-TI-8702B | AAVMVP3 | IP_AnalogMap |
| ☐ | ○ | V01-TI-8703 | AAVMVP3 | IP_AnalogMap |
| ☑ | ○ | V01-TI-8704 | AAVMVP3 | IP_AnalogMap |
| ☐ | ○ | V01-TI-8705 | AAVMVP3 | IP_AnalogMap |
| ☑ | ○ | V01-TI-8706 | AAVMVP3 | IP_AnalogMap |

315

SELECTION OF INPUT AND OUTPUT VARIABLES

↪ Create Model

FIG. 3A

COMPUTER SYSTEM AND METHOD FOR BUILDING AND DEPLOYING PREDICTIVE INFERENTIAL MODELS ONLINE TO PREDICT BEHAVIOR OF INDUSTRIAL PROCESSES

RELATED APPLICATION

This application claims the benefit of U.S. Provisional Application No. 62/514,537, filed on Jun. 2, 2017. The entire teachings of the above application(s) are incorporated herein by reference.

BACKGROUND

Inferential models or soft-sensors have been widely used in petroleum and chemical industries for process control and operation optimization. These models have many well-known advantages, such as being more cost-effective than online analyzers, and relatively easy to build and maintain. Inferential models can be developed with either rigorous first-principles equations or regression equations from process data. In theory, the inferential models with first-principles equations are more reliable to simulate and predict process behaviors than purely data-driven "black-box" empirical models. In practice, however, the inferential models with first-principles equations are expensive to develop and more difficult to maintain. When process operating status is frequently varying due to feedstock or market changes, the inferential models with first-principles equations need online model re-calibration in order to sustain their performance. The need for online model re-calibration makes the wide use of this type of inferential model costly and challenging. Therefore, over the last 30 years, the inferential models seen as most sustainable in process industries are still data-driven empirical models.

Though widely adopted in process industries, inferential models (including traditional empirical inferential models) are not able to meet the new requirements of equipment performance management and asset optimization for predictive and prescriptive solutions. Inferential models cannot meet these requirements because there are drawbacks and limitations associated with these models. First, most inferential models are built based on process steady-state data or limited plant measurements from lab data, and it is impossible to build high fidelity, dynamic inferential models with such data. Second, inferential models developed based on steady-state data have no capability to generate future online predictions of the inferred product properties or process key performance indicators (KPIs) of a plant process. However, online predictive inferential models are desirable and valuable for safe operation and asset optimization. Third, development and deployment of high fidelity inferential models currently need users' intensive inputs and expertise in many steps of practice, which can be a challenge to an already over-loaded process engineer, and, therefore, automation of the workflow can be very helpful and beneficial. Fourth, once the inferential model is built and deployed online, the model needs to be calibrated with new (raw) measured plant operational data. However, the raw measured plant operational data may not always be available and sufficient for re-building the model, and the data may contain many bad quality segments, such as spikes, off-sensors, shutdowns, and such. All these difficulties limit the performance of current inferential models for maximum potential value in online predictive applications.

SUMMARY

Embodiments of the present invention address the deficiencies in inferential models used in process industries. The embodiments are directed to building and deploying online predictive models as high fidelity dynamic inferential models. The embodiments are also directed to the maintenance of the built online predictive models when the process operation scheme or production equipment changes.

Embodiments include computer systems and methods that develop and deploy predictive inferential models in offline and online modes. In an offline mode for model building, the computer systems and methods develop the predictive inferential models based on process historical data, using automatic data screening, data slicing, and input selection techniques to remove bad quality segments from the data. In an online mode, the computer systems and methods deploy the built predictive inferential models to provide accurate, dynamic predictions on one or more product qualities or key performance indicators (KPIs) of a plant process. The systems and methods can also perform online model health monitoring and adaptations on the built predictive inferential models automatically.

The computer-based systems and methods of embodiments execute as follows. The systems and methods build the predictive inferential model to be scalable and with respect to one or more product properties or key process indicators (KPIs) of a plant process. The systems and methods initiate the inferential model structure from a plant asset database (or plant operation historian) by use of a plant piping and instrumentation drawing (P&ID) diagram or tag-search methods to facilitate. Through the P&ID diagram or tag-search methods, the systems and methods may select input and output process variables defining the model structure configuration. The systems and methods further retrieve a dataset consisting of data measurements associated with the selected input and output process variables from the plant operation historian. The systems and methods apply to the dataset an auto-data-slicing technique for bad data cleaning, described in U.S. Pat. No. 9,141,911 B2, which is herein incorporated by reference in its entirety. The systems and methods configure the predictive inferential model based on the selected inputs and output process variable (desirable output property), and build and train the configured predictive inferential model using the input and output data measurements in the dataset. In the case of the output measurements including infrequently measured lab data, the systems and methods optionally select an important measurable process variable (referred to as a "reference variable"). The data measurements for the selected reference variable are used to train the dynamic predictive inferential model.

In embodiments, the systems and methods implement a unique model procedure to build and train the target predictive inferential model, which combines a subspace identification technique and a projection latent structure (PLS) technique. As a result of the model procedure, the systems and methods provide user key statistics associated with the built/trained predictive inferential model, including model fitting statistics $R^2$, PLS model Hotelling $T^2$, data usage in percentage, model inputs sensitivities, the sign and value of model gain for each input, and the like. The systems and methods may also include an input-moves detection module, which determines where the measured inputs by the built/trained predictive inferential contain sufficient moves over the operation data history.

Once the predictive inferential model is built and trained, the systems and methods can confirm the validation settings for the selected inputs and output process variables. The systems and methods then deploy and run the predictive inferential model to generate current estimates, as well as, future predictive values for a product property or a key-performance-indicator (KPI) of the plant process. These current estimates and future predictive values are usually unmeasured or difficult to measure, but very important for the process engineer/operator to keep the plant process operation safe and at an optimal operating condition. The future predictive values (product property or KPIs) may include values for a distillation columns' product quality property, a flooding risk factor, reactors' conversion efficiency, a furnace energy consumption rate, and such.

In practice, multiple predictive inferential models can be built, trained, and deployed in the same computer server and run simultaneously, which allows process operators and engineers to operate and monitor their plant with more transparency and process insights. Over time, however, the process operation scheme or process equipment may change and the deployed predictive inferential models may become inaccurate or fully invalid in the new environment. Therefore, in embodiments, the systems and methods also implement an online model health monitoring system. In order to overcome the model quality degradation, in embodiments, the systems and methods may further implement an online model adaptation module. Once the model-quality indicator reaches a low criterion threshold, the systems and methods activate the online model adaptation module, which updates the predictive inferential model using a model adaptation technique. The model adaptation techniques may execute a data-slicing module, which selects data segments from the measured input and output for updating the predictive inferential model. Thus, embodiments not only assist process operators and engineers in building, training, and deploying multiple predictive inferential models in an easy workflow, but also support self-monitoring and adaptation of inferential models for long-term sustained online performance.

Embodiments are directed to computer systems, methods, and program products for predicting behavior of an industrial process. The computer system comprises a processor and a memory with computer code instructions stored thereon. The memory is operatively coupled to the processor such that, when executed by the processor, the computer code instructions cause the computer system to implement a model builder and a deployment engine. The computer program product comprises a non-transitory computer-readable storage medium having code instructions stored or otherwise embodied thereon. The storage medium is operatively coupled to a processor, such that, when executed by the processor, the computer code instructions cause the processor to implement the elements of the embodiment.

The computer systems, methods, and program products initialize an inferential model of a subject industrial process. To initialize the inferential model, the computer systems, methods, and program products: (i) selects process variables for the subject industrial process, and (ii) configures one of the selected process variables as an output process variable that represents output of the inferential model. In example embodiments, the computer systems, methods, and program products may select the process variables through a user interface by a user dragging and dropping tags corresponding to the process variables from a plant piping and instrumentation drawing (P&ID) diagram into a candidate process list. In the example embodiments, the computer systems, methods, and program products may also select the process variables through a user interface by user searching for tags corresponding to the process variables in a plant historian, the searched tags being placed in the candidate process variable list. In the example embodiments, the computer systems, methods, and program products configure a subset of tags in the candidate process as inputs of the inferential model, and configuring one tag as output of the inferential model.

The computer systems, methods, and program products load measurements for the selected process variables into a dataset. The loaded measurements for the configured output process variable are of a particular type, which can be continuously sampled, or infrequently sampled from an online analyzer or from lab analysis. The type of output measurements determines the model output type. In some embodiments, the computer systems, methods, and program products perform data screening on the loaded inputs and output variable measurements to identify and cleanse bad data segments from the loaded measurements. The bad data segments including at least one of: missing data samples, bad values, short term outliers, values at high or low process limits, and frozen signals. Based on the particular model output measurements type, the computer systems, methods, and program products determine a model structure representing the inferential model. Using the loaded measurements, the computer systems, methods, and program products build and train the inferential model according to the determined model structure.

In some embodiments, the particular model output type is: continuous, analyzer, lab data, or lab data with a reference variable. The reference variable is a process variable of the subject industrial process that highly correlates to the configured output process variable in the subject industrial process.

When the particular model output type is continuous, the computer methods, systems, and program products perform as follows. The loaded measurements for the configured output process variable are continuous measurements collected from the subject industrial process. Then the particular model output type is continuous, the determined model structure is a finite impulse response (FIR) model. Using the continuous input measurements as inputs, and continuous output measurements as output, the inferential model is built and trained as the FIR model with a subspace identification technique.

When the particular model output type is analyzer, the computer methods, systems, and program products perform as follows. The loaded measurements for the configured output process variable are intermittent samples generated by an analyzer. The analyzer generates the intermittent samples by analyzing online the subject industrial process. The intermittent samples are converted into continuous measurements by applying non-phase-shift filtering, which interpolates measurement between the intermittent samples. The determined model structure is a FIR model and the model is built with a subspace identification technique. Using the converted continuous output measurements as output, and continuous inputs measurements as input, the inferential model is trained as a FIR model with the subspace identification technique.

When the particular model output type is lab data, the computer methods, systems, and program products perform as follows. The loaded measurements for the configured output process variable are intermittent samples from lab analysis of the subject industrial process. The determined model structure is a linear regression model and the model is built with a projection latent structure (PLS) technique. Using the intermittent samples, the inferential model is trained as the linear regression model with the PLS technique. When the particular model output type is lab data with a reference variable selected, the computer methods, systems, and program products perform as follows. The loaded measurements for the configured output process variable are intermittent samples from lab analysis of the subject industrial process. The determined model structure is a hybrid FIR model and it is built with a subspace identification technique and a PLS technique. Using continuous measurements for the reference variable, the inferential model is trained as the hybrid FIR model with the subspace identification technique and the PLS technique.

In some embodiments, the computer systems, methods, and program products use a recursive prediction bias update scheme online to compensate for prediction offset due to unknown process disturbances or process shifts to an online deployed inferential model. In these embodiments, the computer systems, methods, and program products update prediction bias using the inferential model based on the calculated current KPIs. The computer systems, methods, and program products apply the updated prediction bias to correct the KPI predictions of the subject industrial process. The computer systems, methods, and program products generating current and future, continuous, bias-compensated process KPI prediction values of the subject industrial process.

In some embodiments, the computer systems, methods, and program products monitor the deployed inferential model online to detect performance degradation of the deployed inferential model in predicting the behavior of the subject industrial process. If performance degradation is detected, the computer systems, methods, and program products automatically (without necessitating user intervention) update the deployed inferential model according to the determined model structure. In some of these embodiments, the computer systems, methods, and program products may monitor the deployed inferential model online by loading recent measurements for the selected process variables. The computer systems, methods, and program products next calculate model predictions and PLS model statistics from the loaded recent measurements. The PLS model statistics including at least one of Hotelling $T^2$ statistics and output statistics squared prediction error (SPE). The computer systems, methods, and program products then compare the calculated PLS model statistics to confidence thresholds. If the calculated PLS model statistics do not meet the confidence thresholds, the computer systems, methods, and program products detect performance degradation in the deployed inferential model. Then the computer systems, methods, and program products automatically update the inferential models accordingly.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

A better understanding of the present invention can be obtained when the following detailed description of the preferred embodiment is considered in conjunction with the following drawings, in which:

FIG. 3A is an example user interface screen used to initialize the structure of an inferential model in the methods of FIGS. 2A and 2B.

DETAILED DESCRIPTION

Figure 1:
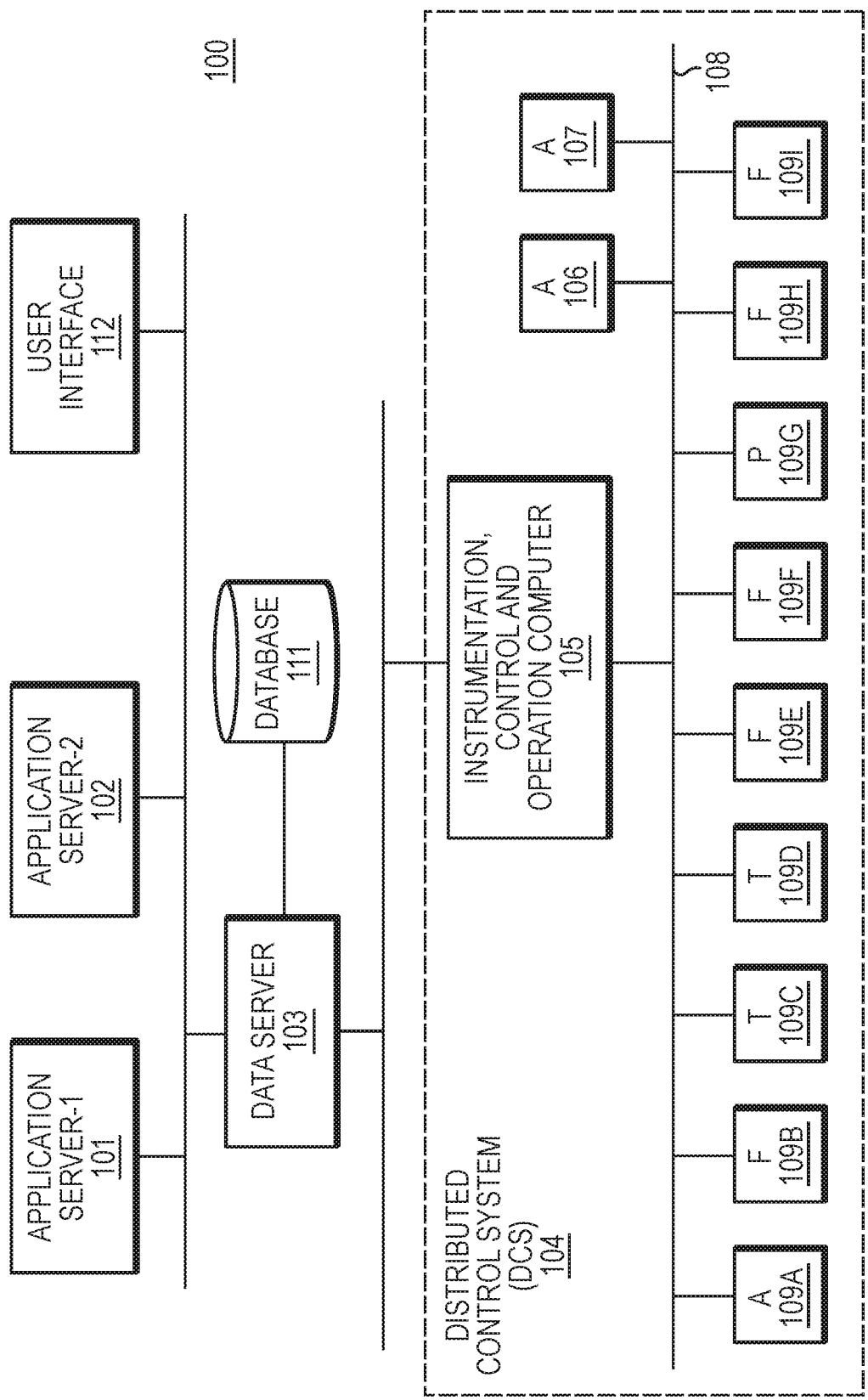
FIG. 1 is a block diagram depicting an example network environment for data collection and monitoring of a plant process in embodiments of the present invention.

A description of example embodiments follows.

The teachings of all patents, published applications and references cited herein are incorporated by reference in their entirety.

Overview

Soft-sensors or inferential models have been widely used (for decades) in refinery, petro-chemical, and chemical process industries for advanced process control. The commercial engineering software for offline model development and online applications have also advanced tremendously over the last 20 years. For example, Aspen IQ, a representative software package, has been used to build an average of 5-10 linear inferential models per Multivariable Predictive Control (MPC) controller in a refinery, and an average of 3-6 nonlinear inferential models per MPC controller in a polymer plant.

However, typical inferential models used in the process industry are so-called "soft-sensor" models, which provide product quality estimate for the "current moment" only. These inferential models cannot provide dynamic future predictions. One reason for this limitation is because most product quality measurements are obtained from intermittent lab data or infrequently sampled analyzer measurements (as a model output). From this data, there are not enough frequently sampled measurements available to build and train a continuous, high-fidelity dynamic predictive inferential model. Therefore, dynamic future predictions cannot be generated from the typical inferential models for equipment performance management and asset optimization. Further, in online inferential model applications, most inferential models use model-bias update scheme (rather than adaptive schemes) to keep the online inferential models following process changes. Existing literature proposes various adaptive schemes for inferential models. However, in industrial practice, successful applications of these adaptive schemes are rarely reported due to the lack of: informative process data, appropriate data selection techniques, robust online model adaptation technique, and such.

Equipment performance management and plant asset optimization require a predictive solution. For example, a predictive inferential model providing product quality or future estimation of various process KPIs of a plant process, such as a distillation column's top and bottom products' qualities KPI and a reflecting flooding risk factor KPI, is most desirable. Such KPIs can be extremely important for a plant operator to watch and monitor continuously. For example, once the predicted product quality runs above/below the high/low limits, or the risk factor gets close to a critical threshold, process KPIs trigger an early warning to the plant operator. In turn, this early warning enables the plant operator to take corresponding actions, so that the out-spec products and unwanted plant shutdown (e.g., due to column flooding) can be timely prevented in the plant process.

When compared to previous approaches, the embodiments of the present invention extend the traditional building, training, and deploying of inferential models in the process industry. The embodiments add future prediction capabilities to the inferential models for reliably and continuously predicting estimations of important product quality and generating process KPIs. The embodiments also provide a robust online model health monitoring and adaptation technique to ensure sustained performance of the predictive inferential models in a time-varying environment. In such a way, the embodiments provide reliable, accurate, and predictive future product properties or process KPI values in an online application. The embodiments provide a new method to allow process engineers and operators to build, train, and deploy numerous predictive inferential models online, which can be very helpful in practice to plant equipment performance management and asset optimization.

The embodiments include systems and methods that are directed to an improved approach to build, train, and deploy predictive inferential models for monitoring a plant process. The systems and methods build and train each predictive inferential model for online estimation of current values of one or more product properties or KPIs of the plant process, as well as predictive future values of the plant process from a specified time window moving forward into future. In an offline mode, the systems and methods build and train the predictive inferential models using historical data of the plant process, which may be automatically screened, sliced, and data selection techniques applied to remove bad segments from the data. The historical process data includes continuous input data, and at least one of continuous, analyzer, or lab data for output data. For historical process output data only available from intermittent lab analysis results, the systems and methods may apply a unique reference variable approach with subspace identification and PLS techniques to build and train the predictive inferential model.

Then, in an online mode, the systems and methods deploy the built and trained predictive inferential models to provide accurate and dynamic future predictions of the one or more product qualities or KPIs of the plant process. The systems and methods also automatically perform online model health monitoring and inferential model adaptations on the deployed predictive inferential models.

Example Network Environment for Plant Processes

FIG. 1 illustrates a block diagram depicting an example network environment 100 for monitoring and performing predictive analytics on plant processes in embodiments of the present invention. System computers (application servers) 101, 102 may operate as a predictive inferential analyzer. In some embodiments, each one of the system computers 101, 102 may operate in real-time as the predictive inferential analyzer of the present invention alone, or the system computers 101, 102 may operate together as distributed processors contributing to real-time operations as a single predictive inferential analyzer. In other embodiments, additional system computers may also operate as distributed processors contributing to the real-time operation as a predictive inferential analyzer. In some embodiments, system computers 101, 102 operating as the predict inferential analyzer may be configured with a model builder and deployment engine for building/deploying a predictive inferential model for performing predictive analytics on the plant process. The system computer 101, 102 may communicate with a display device configured with a user interface (UI) 112 for a user to provide input in building, training, and deploying the predictive inferential model and to view the results of the built, trained, and deployed predictive inferential model.

The system computers 101 and 102 may communicate with the data server 103 to access collected data for measurable process variables from a historian database (or plant asset database) 111. The data server 103 may be further communicatively coupled to a distributed control system (DCS) 104, or any other plant control system, which may be configured with sensors and instruments 109A-109I that collect data at a sampling period (e.g., one sample per minute). The sensors and instruments 109A-109I may continuously collect (sample) data for the measurable process variables, and online analyzers 106,107 (e.g., Gas Chromatographs) may collect data at a longer sampling period (e.g., every 15-60 minutes). Data may also be collected from lab analysis results with an even longer sampling period (e.g., 8 to 48 hours). The instruments may communicate the collected data to an instrumentation, control, and operation computer 105, also configured in the DCS 104, and the instrumentation, control, and operation computer 105 may in turn communicate the collected data to the data server 103 over communications network 108. The data server 103 may then archive the collected data in the historian database 111 for building and training the predictive inferential model. The data collected varies according to the type of target process and may be retrieved in real-time from the historian database 111.

The collected data may include measurements for various measurable process variables. These measurements may include a feed stream flow rate as measured by a flow meter 109B, a feed stream temperature as measured by a temperature sensor 109C, component feed concentrations as determined by an analyzer 109A, and reflux stream temperature in a pipe as measured by a temperature sensor 109D. The collected data may also include measurements for process output stream variables, such as the concentration of produced materials, as measured by analyzers 106 and 107. The collected data may further include measurements for manipulated input variables, such as reflux flow rate as set by valve 109F and determined by flow meter 109H, a re-boiler steam flow rate as set by valve 109E and measured by flow meter 109I, and pressure in a column as controlled by a valve 109G. The collected data reflects the operation conditions of the representative plant during a particular sampling period.

The collected data is archived in the historian database (or plant asset database) 111 for access by the model builder (executing on system computers 101, 102) to build/train an inferential model. Based on the type of output data archived for a process variable, the model builder may build/train a predictive inferential model as a FIR model with a subspace identification technique, a linear regression model with a PLS technique, or a hybrid FIR model with subspace identification and PLS techniques.

In FIG. 1, the deployment engine (executing on system computer 101 and 102) may execute the built predictive inferential model for online deployment. The values generated by the predictive inferential model on the system computer 101, 102 may be provide to the instrumentation, control, and operation computer 105 over the network 108 for operator to view at the UI 112. Through the viewed values, the user may perform health and performance monitoring, model updates, and automatically programs any other component of the DCS 104, or any other plant control system or processing system coupled to the DCS system 104. Alternatively, the instrumentation, control, and operation computer 105 can store the historical data 111 through the data server 103 in the historian database 111 and execute the predictive inferential model in a stand-alone mode. Collectively, the instrumentation, control, and operation computer 105, the data server 103, and various sensors and output drivers (e.g., 109A-109I, 106, 107) forming the DCS 104, work together to implement and run the presented application.

The example architecture 100 of the computer system supports the process operation of the present invention in a representative plant. In this embodiment, the representative plant may be a refinery or a chemical processing plant having a number of measurable process variables such as temperature, pressure and flow rate variables. It should be understood that in other embodiments the present invention may be used in a wide variety of other types of technological processes or equipment in the useful arts.

Method of Building and Deploying Inferential Model

Figure 2A:
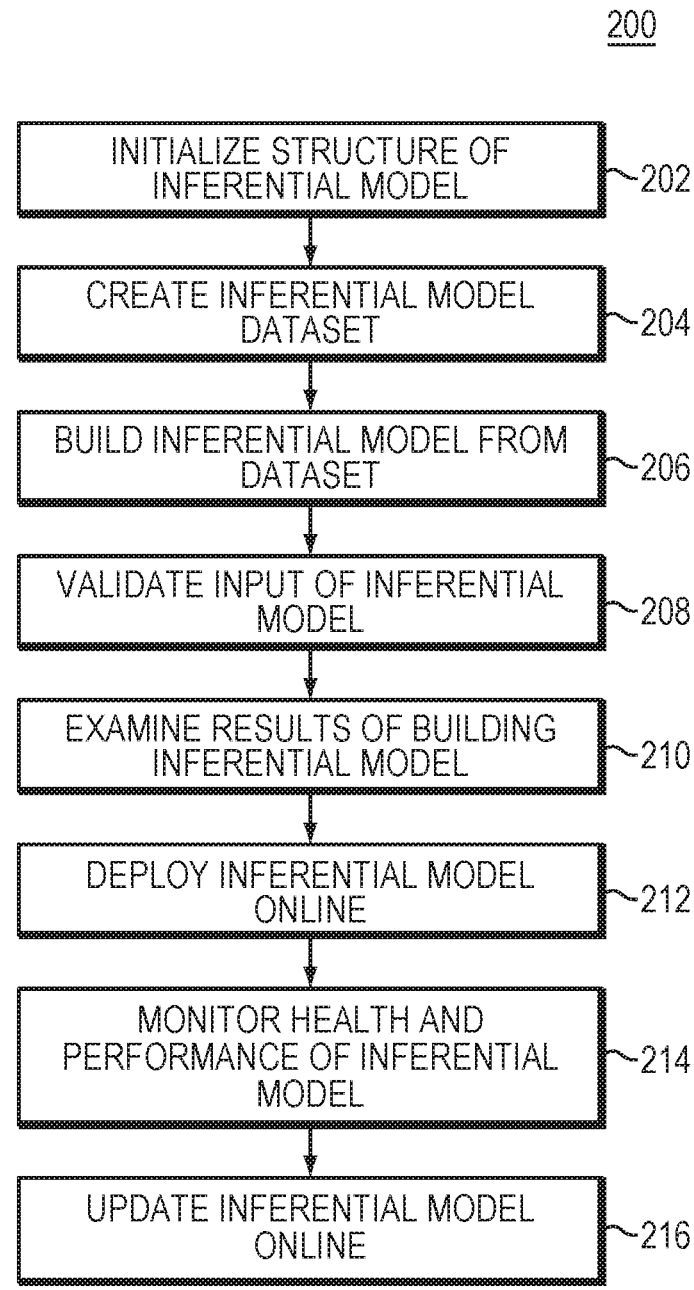
FIG. 2A is a flowchart depicting an example method of building and deploying an inferential model to predict product quality in embodiments of the present invention.

FIG. 2A illustrates a flowchart of an example method 200 of building and deploying a dynamic inferential model in embodiments of the present invention. The built and deployed dynamic inferential model is used to generate current estimates and future predictions of product properties (e.g., quality) or KPIs for a plant (industrial) process. The built and deployed dynamic inferential model is also referred to as a "predictive inferential model." Some steps of the example method 200 are described in further detail in FIGS. 2B-2I.

Figure 2B:
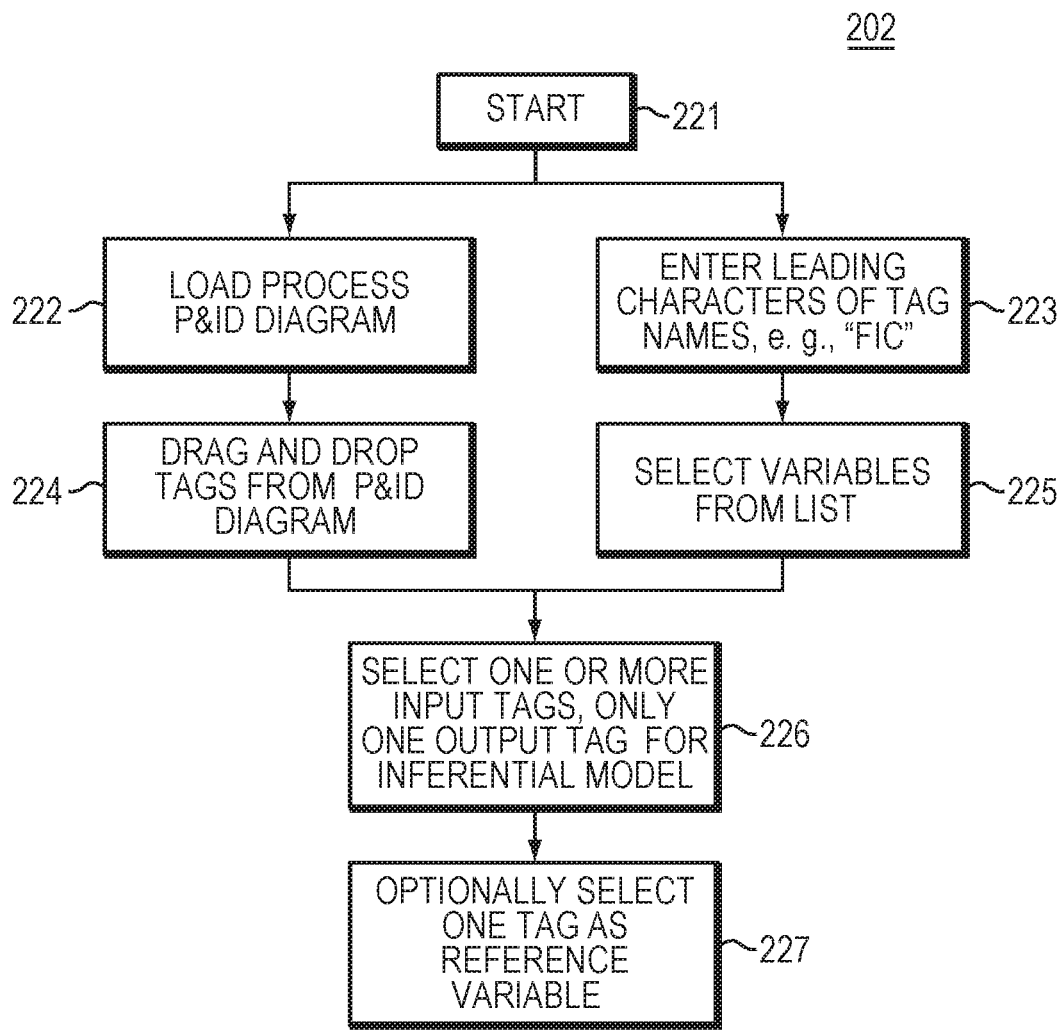
FIG. 2B is a flowchart depicting an example method of initializing the structure of an inferential model in the method of FIG. 2A.
Figure 3B:
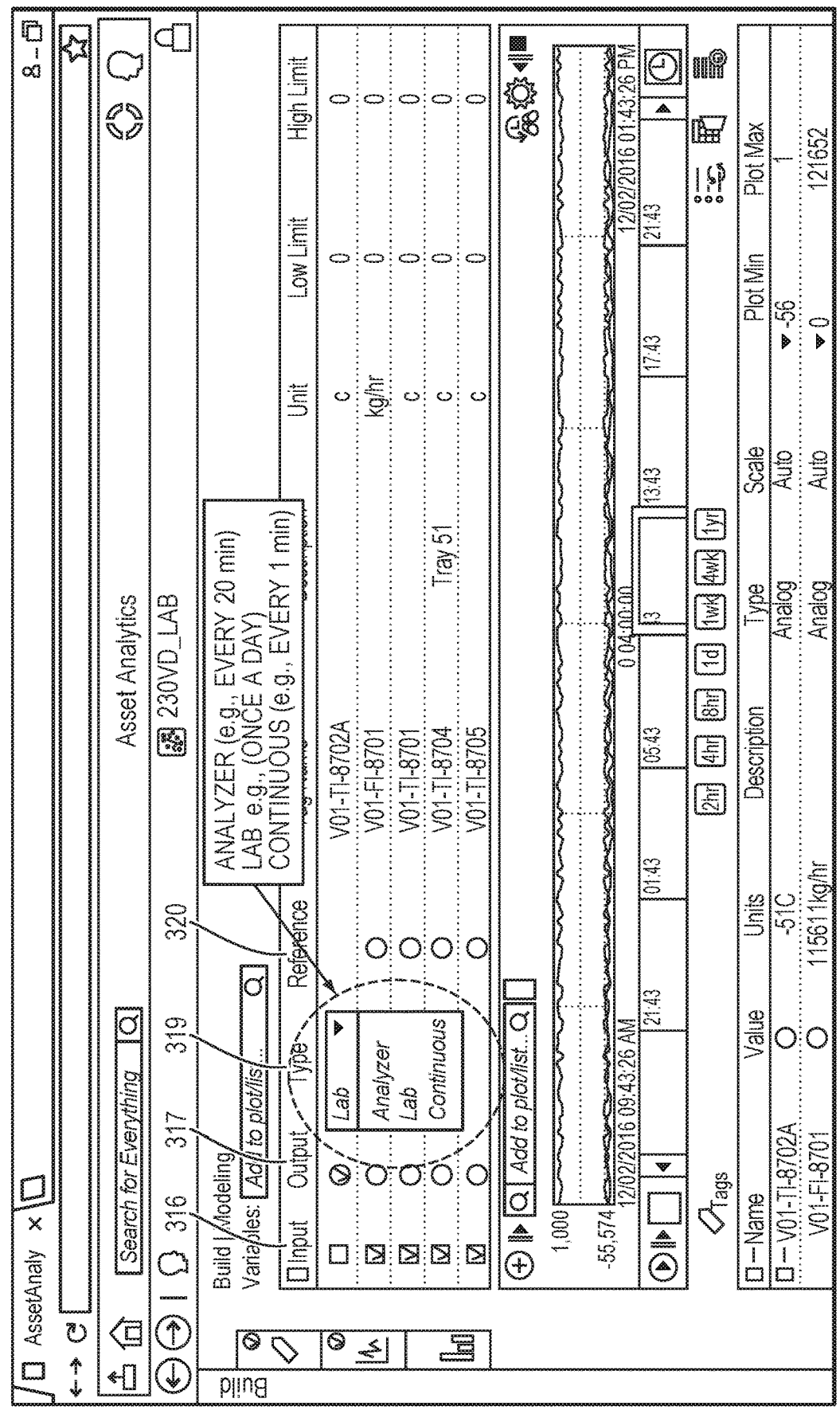
FIG. 3B is an example user interface screen used to select an output model type for an inferential model in the methods of FIGS. 2A, 2D, and 2E.
Figure 3C:
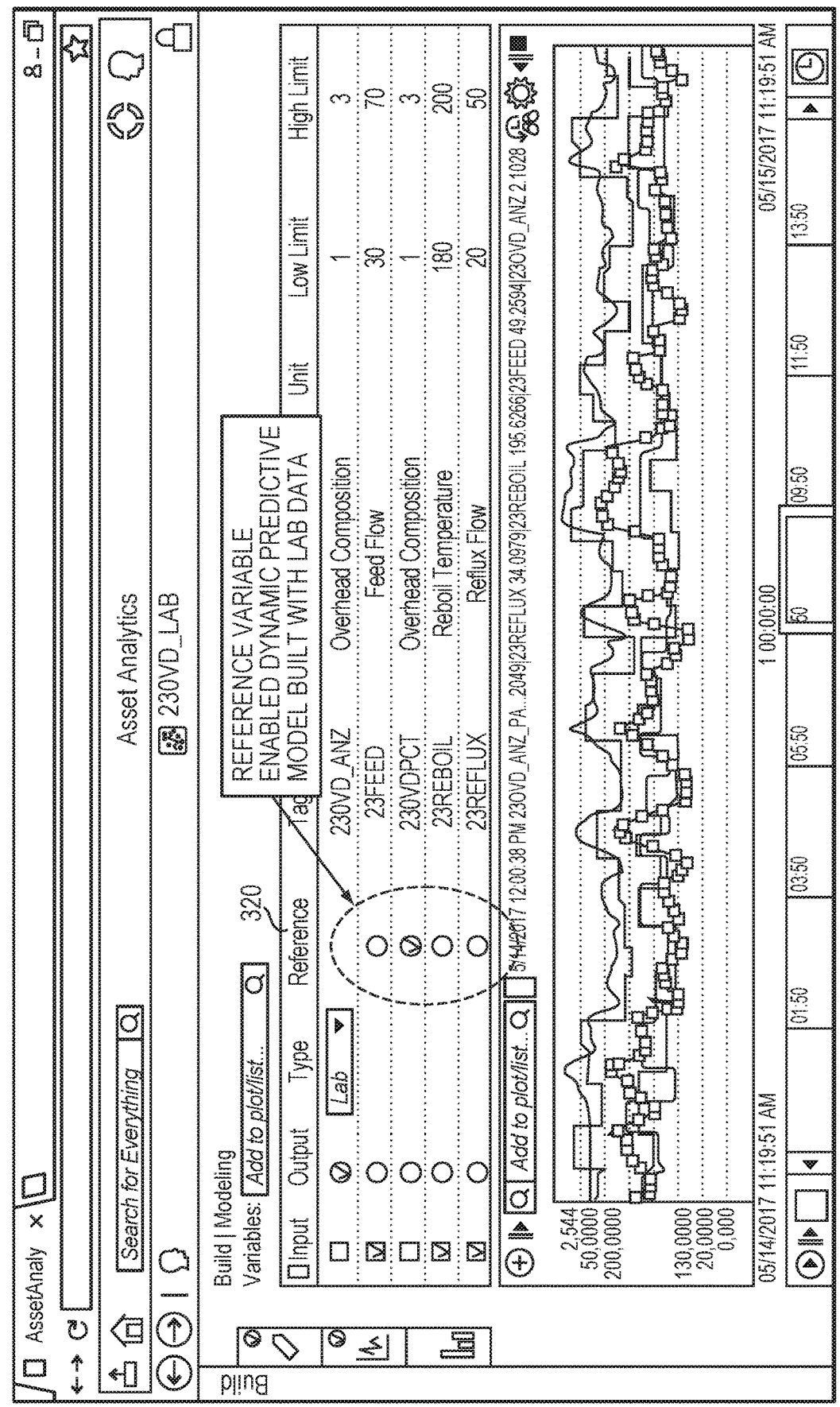
FIG. 3C is an example user interface screen used to select reference variable for an inferential model in the methods of FIGS. 2A, 2D, and 2E.

Method 200 begins at step 202 by initializing the model structure of the predictive inferential model. To initialize the model structure, the method 200 (step 202) selects process variables (or properties) 318 of a subject plant process from a plant asset database (or plant historian) 111. The method 200 (step 202) marks each selected process variable 318 as input 316 or output 317 within the structure of the predictive inferential model. For example, a user 236 (via a user interface 112) may mark the selected process variables 318 as input 316 or output 317, as shown in FIGS. 3A and 3B. Optionally, the method 200 (step 202) may mark a selected process variable 318 as a reference variable 320. For example, a user 236 (via a user interface 112) may mark a selected process variable 318 as a reference variable 320, as shown in FIG. 3C. An example method for performing step 202 of method 200 is shown in FIG. 2B.

Figure 2C:
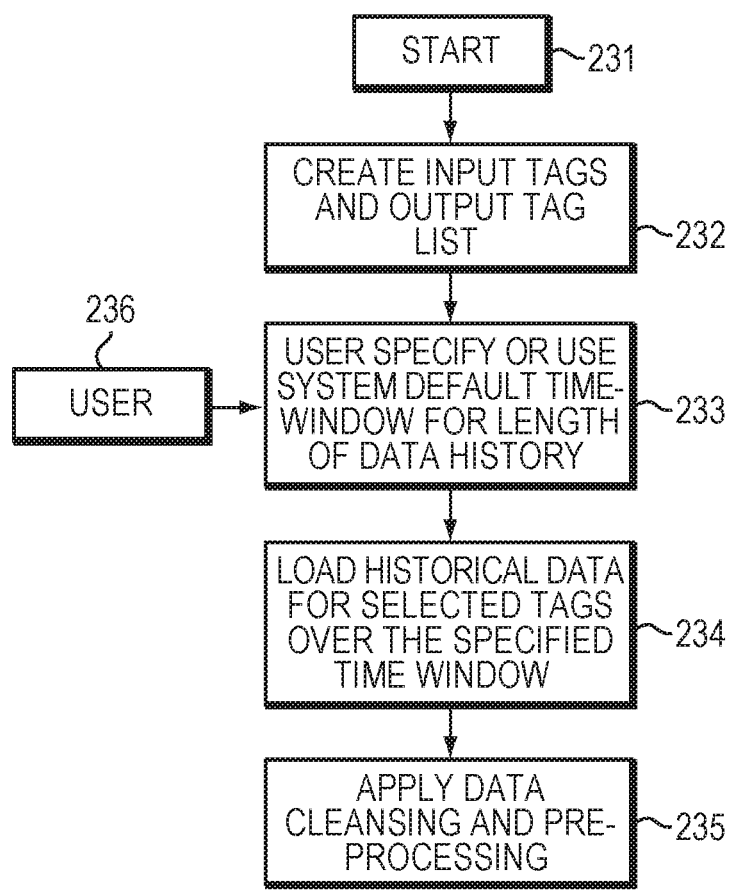
FIG. 2C is a flowchart depicting an example method of creating an inferential model dataset in the method of FIG. 2A.

Once the model structure is initialized, method 200, at step 204, creates an inferential model dataset. To create the dataset, the method 200 (step 204) loads historical data from the plant asset database (or plant historian) 111 for the selected input and output process variables 316, 317. The method 200 (step 204) loads the historical data from the plant asset database 111 over a specified or default time window. The loaded historical data for the input process variables 316 is continuous measurements of the subject plant process, while the loaded historical data for the output process variable 317 is either: continuous measurements, intermittent analyzer measurements, or intermittent lab analysis results of the subject plant process. As part of creating the dataset, the method 200 (step 204) may apply data screening (cleansing) to the loaded historical data, such as described in U.S. Pat. No. 9,141,911 B2, which is herein incorporated by reference in its entirety. An example method for performing step 204 of method 200 is shown in FIG. 2C.

The method 200, at step 206, builds and trains the prediction inferential model using the dataset created in step 204. The method 200, at step 206, uses different inferential models for building and training the predictive inferential model based on the type of measurements 319 in the dataset for the output process variable (i.e., continuous measurements, intermittent analyzer measurements, or intermittent lab analysis results). For example, a user 236 may indicate (via a user interface 112) the type of output measurements 319 in the dataset to build/train the predictive inferential model, as shown in FIG. 3B. In this way, the method 200 may build and deploy multiple inferential models using different output measurement types 319. Multiple predictive inferential models may be built and trained by repeating steps 202 through 208, such as simultaneously on the same plant computer server 101, 112. Example methods for performing step 206 of method 200 are shown in FIGS. 2D-2I.

Figure 3D:
FIG. 3D is an example user interface screen for performing input validation of a built inferential model in the method of FIG. 2A.

The method 200, at step 208, next validates the input process variables of the model. The method 200 (step 208) may use optional input validation techniques to check the validity of selected input process variables. The input validation may be initiated by the user 236 (via a user interface 112) for particular selected process input variables, as shown in FIG. 3D. Optionally, the user 236 may edit and update validation high and low limit values for each individual variable, and may also enable or disable one or more validation executions, as shown in FIG. 3D.

Figure 3E:
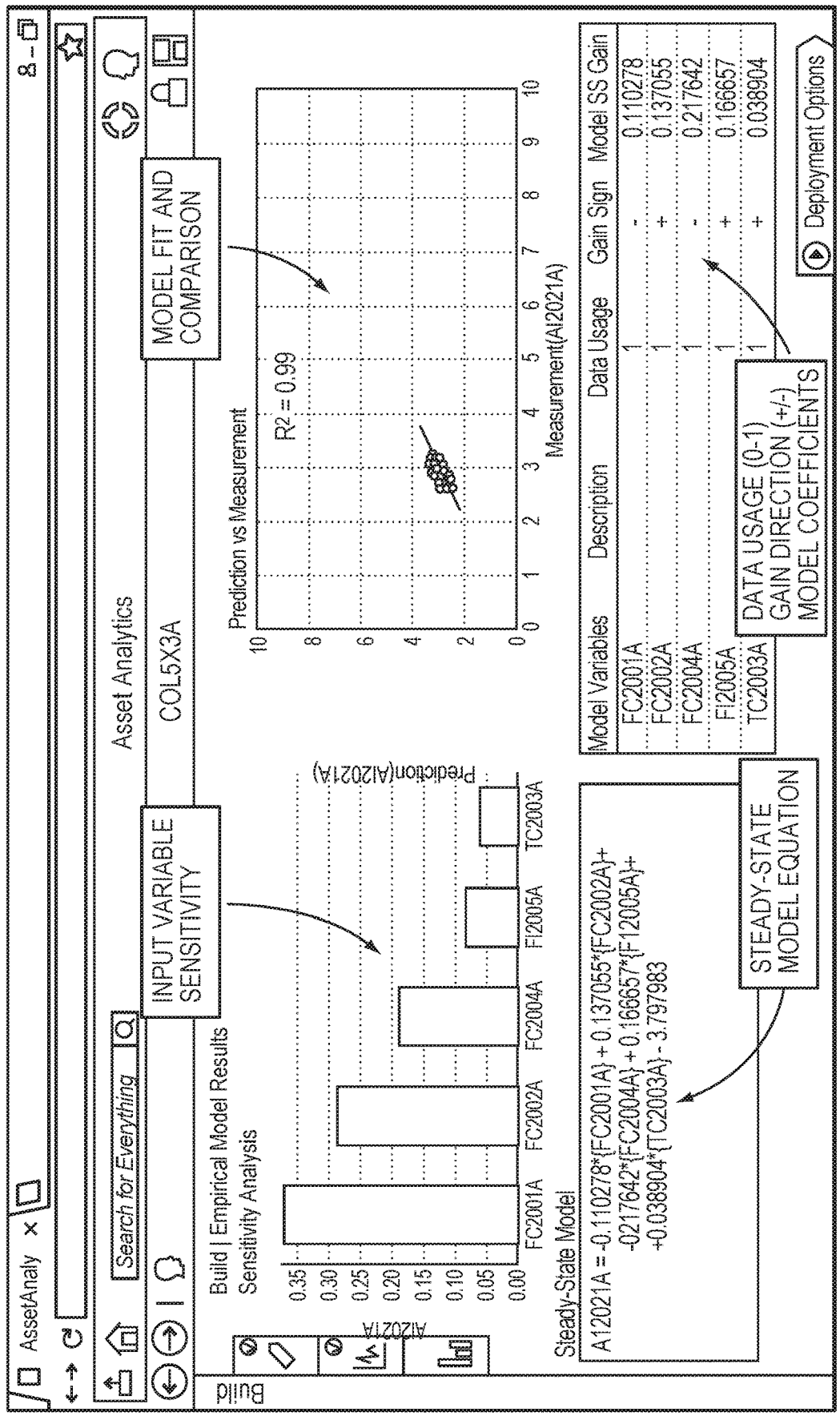
FIG. 3E is an example user interface screen for examining results of building an inferential model in the method of FIG. 2A.

The method 200, at step 210, then examines (reviews) the results, data usage, and model training statistics of the built, trained, and validated predictive inferential model. For example, the method 200 (step 210) may present (via user interface 112) model statistics on the modeling results for viewing by the user 236, as shown in FIG. 3E. The viewed results displayed in the summary UI represent key statistics associated with the resulted model, including model fitting statistics $R^2$, scatter-plot of output measurements versus model predictions, data usage in percentage, model inputs sensitivities, the sign and value of model gain for each process input variable (input channel), and such. The viewed results may also show confirmation of the deployment of identified models and connections/validations of all real-time data flow between computing servers 101, 102 and required data sources.

Figure 3F:
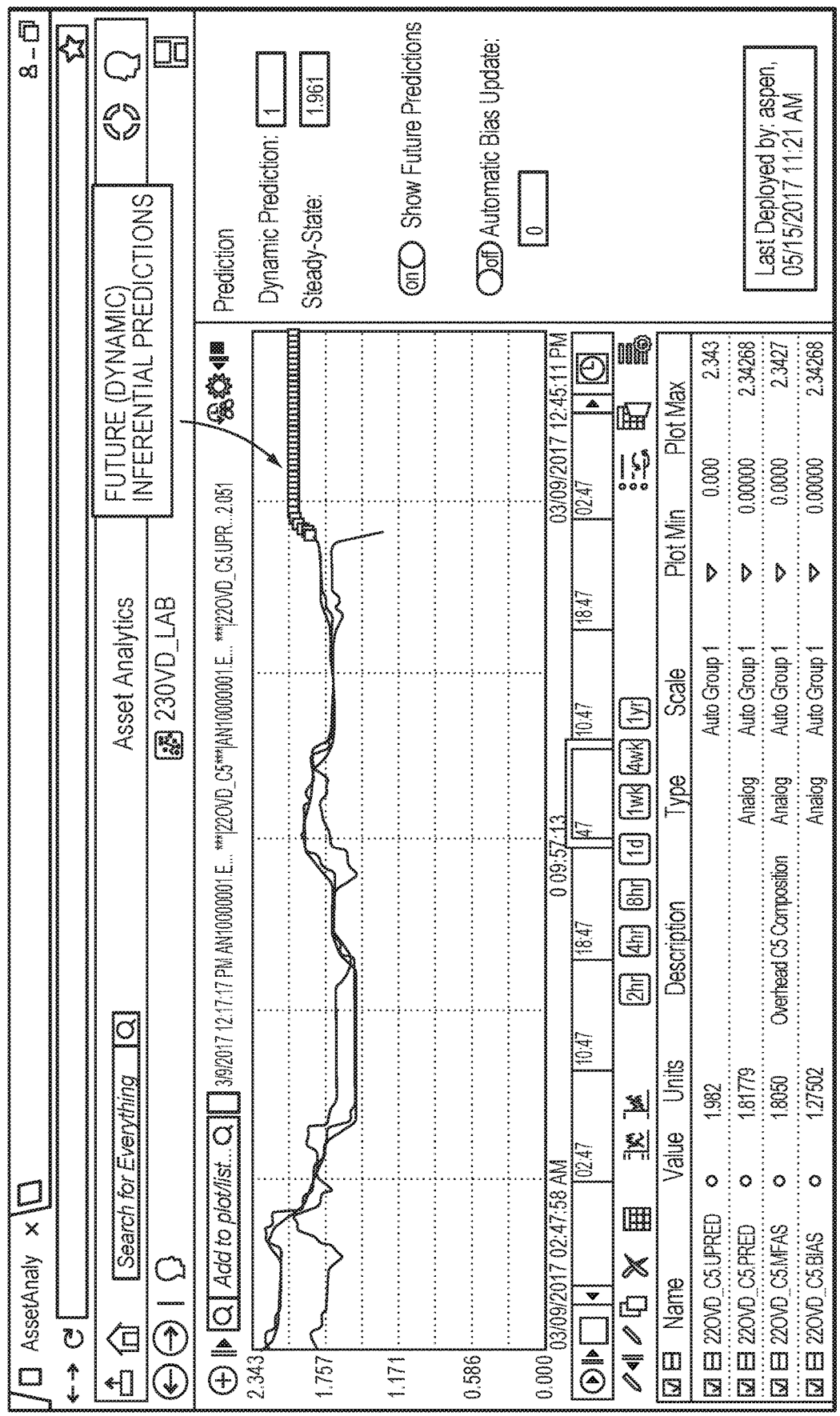
FIG. 3F is an example user interface screen showing online predictions from a deployed inferential model in the method of FIG. 2A.

After model results are examined, the method 200, at step 212, deploys the predictive inferential model online for generating continuous predictions of the subject product property (selected output process variable 317) or KPIs for the subject plant process. As part of the deployment, the user 236 may select using a default (e.g., 0.9) or editing a parameter (e.g., called "lab bias fraction") for configuring an online inferential model bias update scheme, as shown in FIG. 3D. The user 236 may also continue to select individual high/low limits for each input process variables 316 to perform online validation, as described in step 208 and shown in FIG. 3D. The method 200 (step 212) deploys the predictive inferential model to run online and display (via user interface 112) for the selected process variables 316, 317 their respective recent history, current estimate, and future predictions, as shown in FIG. 3F. By deploying multiple predictive inferential models, the process operators and engineers are able to operate and monitor their plant with more transparency and process insights.

The method 200, at step 214, also monitors health and performance of the deployed online predictive inferential models, such as performance degradation of the predictive inferential model over time. For example, after one or more predictive inferential models are deployed, the method 200 (step 214) can monitor the health conditions of a deployed model using PLS model statistics, such as Hotelling $T^2$ and squared prediction error (SPE) techniques, as a model performance indicator. For example, the method 200 (step 214) may check the deployed predictive model for confidence thresholds (e.g., 95% or 99%), examine model t-scores over the recent history, and flag model degradation level once statistics moves out of confidence range. Once the process operation scheme or process equipment changes and the deployed predictive inferential model become inaccurate or fully invalid in the new environment, the method 200 (step 214) uses the model performance indicator as a flag to trigger an online model adaptation scheme to update the deployed predictive inferential model. The method 200 (step 214) may perform the model adaptation scheme by a data search technique combined with a recursive PLS technique. In some embodiments, the method 200 (step 214) uses model quality monitoring and online model adaptation techniques described in U.S. Pat. No. 8,560,092 B2, which is herein incorporated by reference in its entirety.

The method 200, at step 216, further updates the deployed predictive inferential model online when the process changes and the model performance become sub-optimal. For example, the method 200 (step 216) may activate adaptive functions of the online deployed predictive inferential model to update the deployed predictive inferential model online. The method 200 (step 216) may also load recent measurements in the data historian 111 for the input process variables and output process variables of the deployed predictive inferential model and update the deployed predictive inferential model online with the recent measurements. The method 200 (step 216) may apply data screening and selection techniques to prepare and pre-process the loaded recent measurements. The method 200 (step 216) may also update model parameters partially or fully by using a recursive PLS technique, and re-calculate model statistics with the updated model parameters to track model health status. In some embodiments, the method 200 (step 216) may stop updating the model parameters in one or more of the following situations: (i) when model performance improves and remains at the improved level for a threshold, or (ii) input data (measurements) contain less moves over the recent data history. An input-moves detection module may be used to determine if the input measurements contain sufficient moves over the recent data history.

Figure 2D:
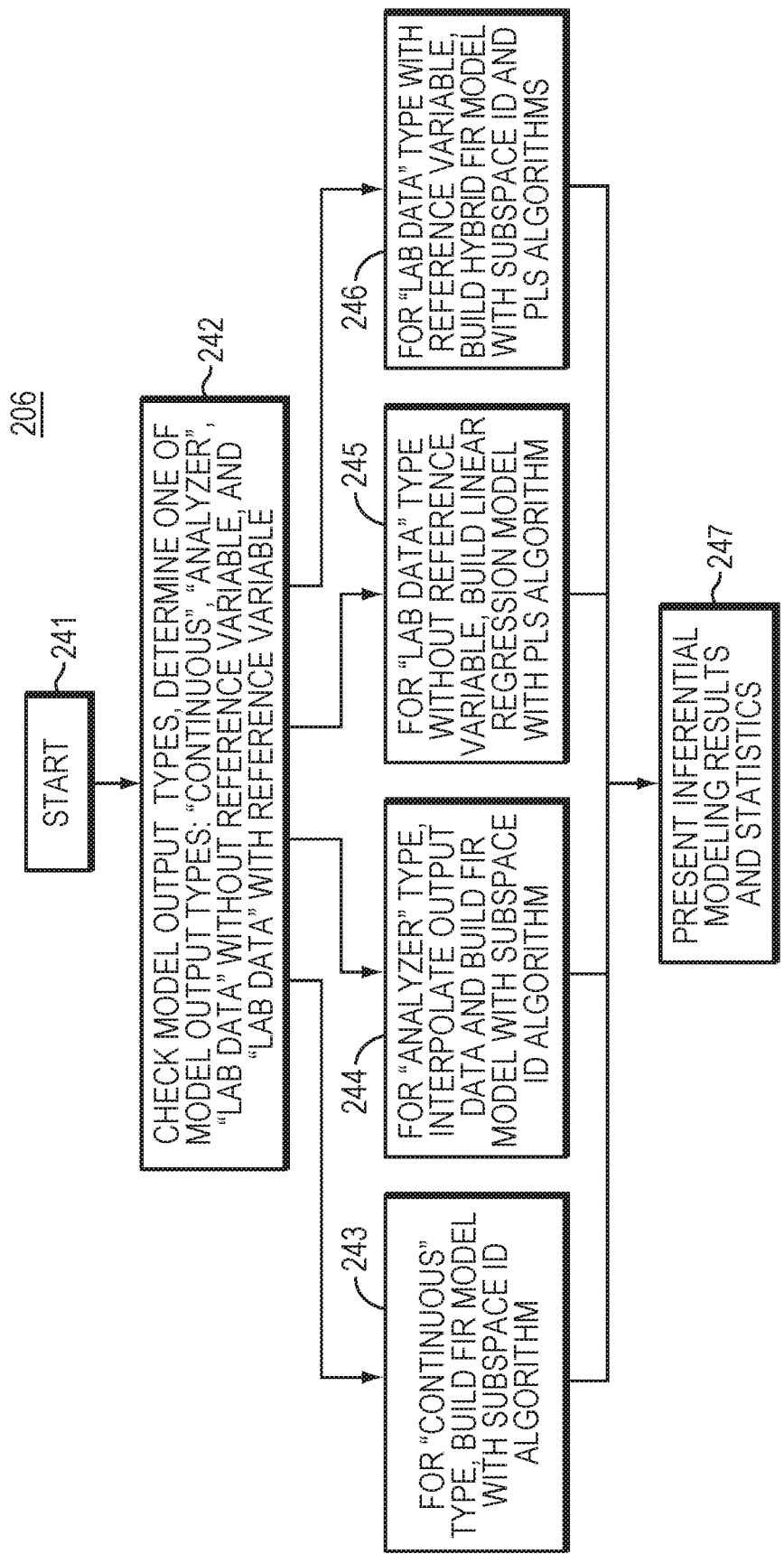
FIG. 2D is a flowchart depicting an example method of building a dynamic inferential model from a created dataset in the method of FIG. 2A.
Figure 2E:
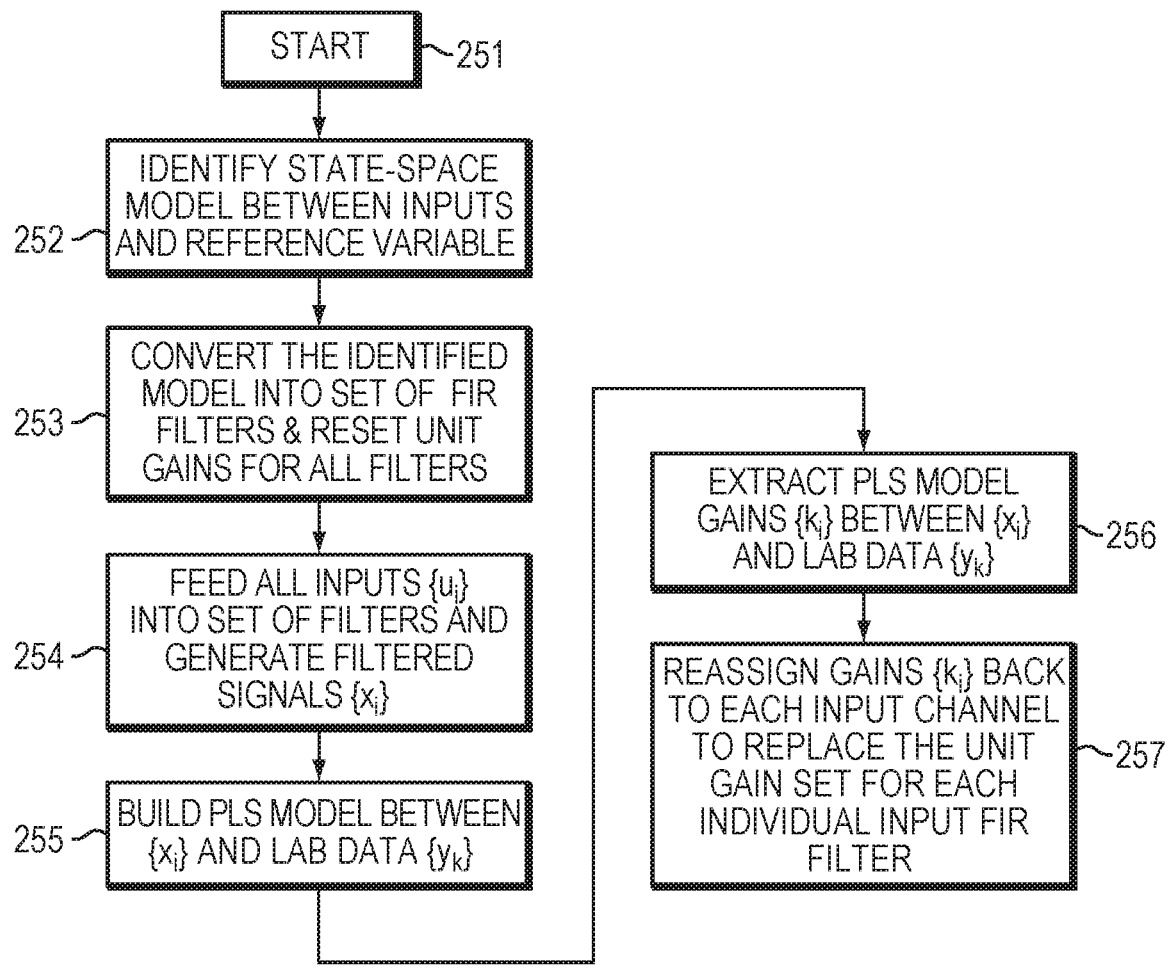
FIG. 2E is a flowchart depicting an example method of building a hybrid inferential model in the method of FIG. 2A.
Figure 2F:
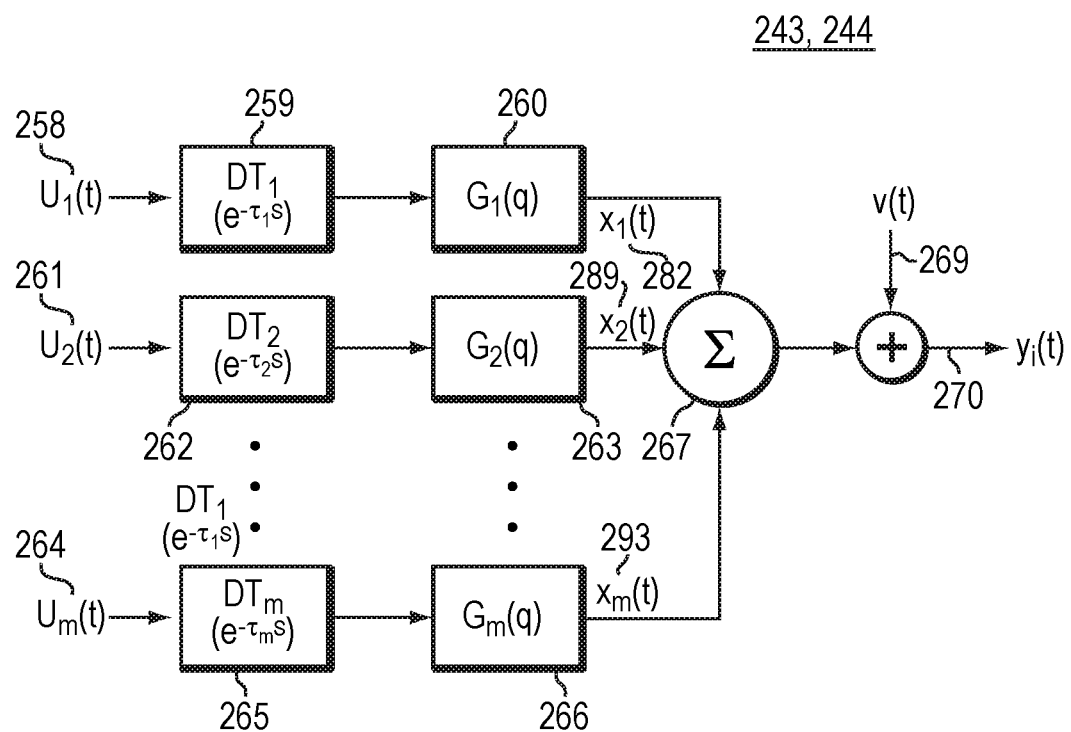
FIG. 2F is a block diagram depicting an example multiple input single output (MISO) model used to build a dynamic inferential model in the method of FIG. 2A.
Figure 2G:
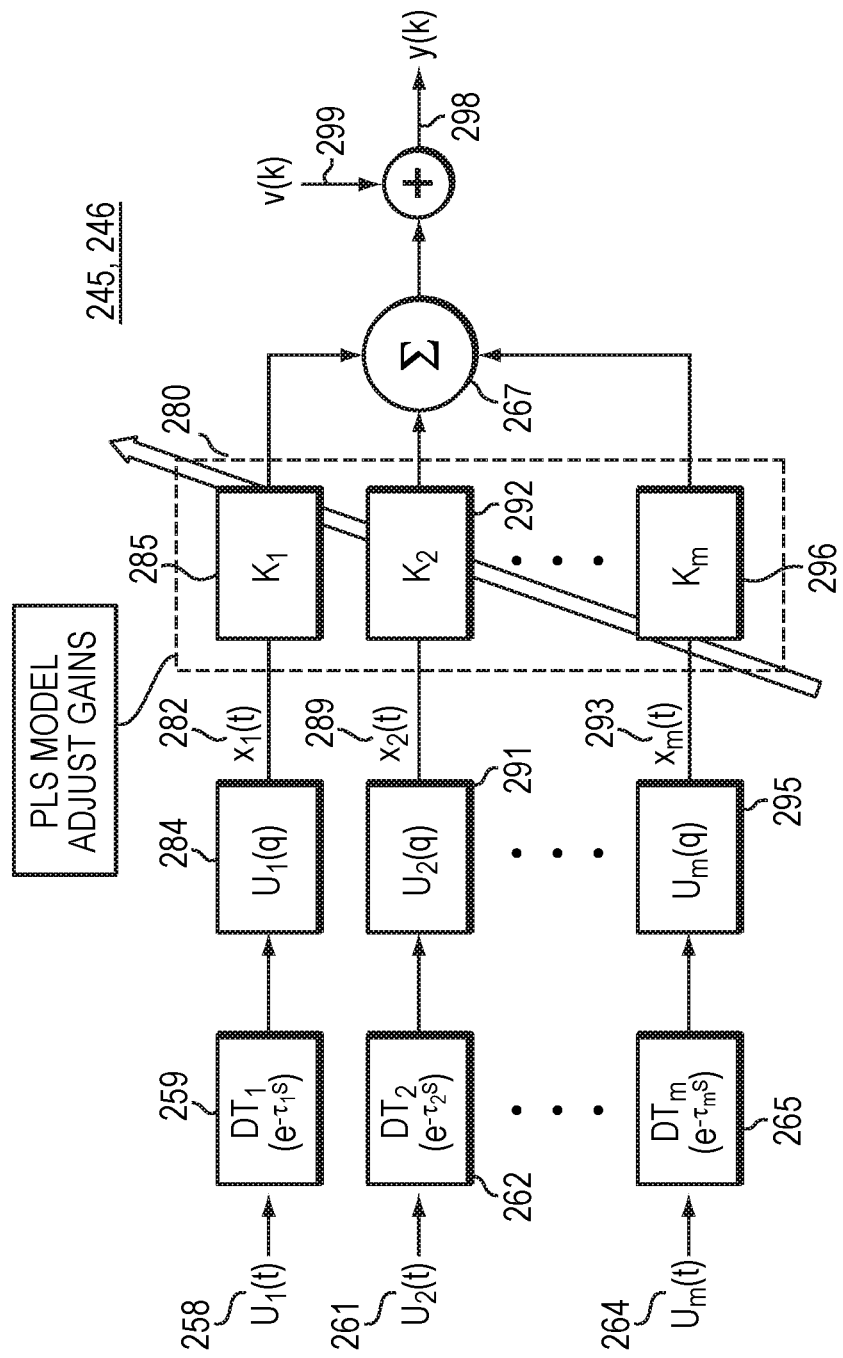
FIG. 2G is a block diagram depicting another example MISO model used to build a dynamic inferential model in the method of FIG. 2A.
Figure 2H:
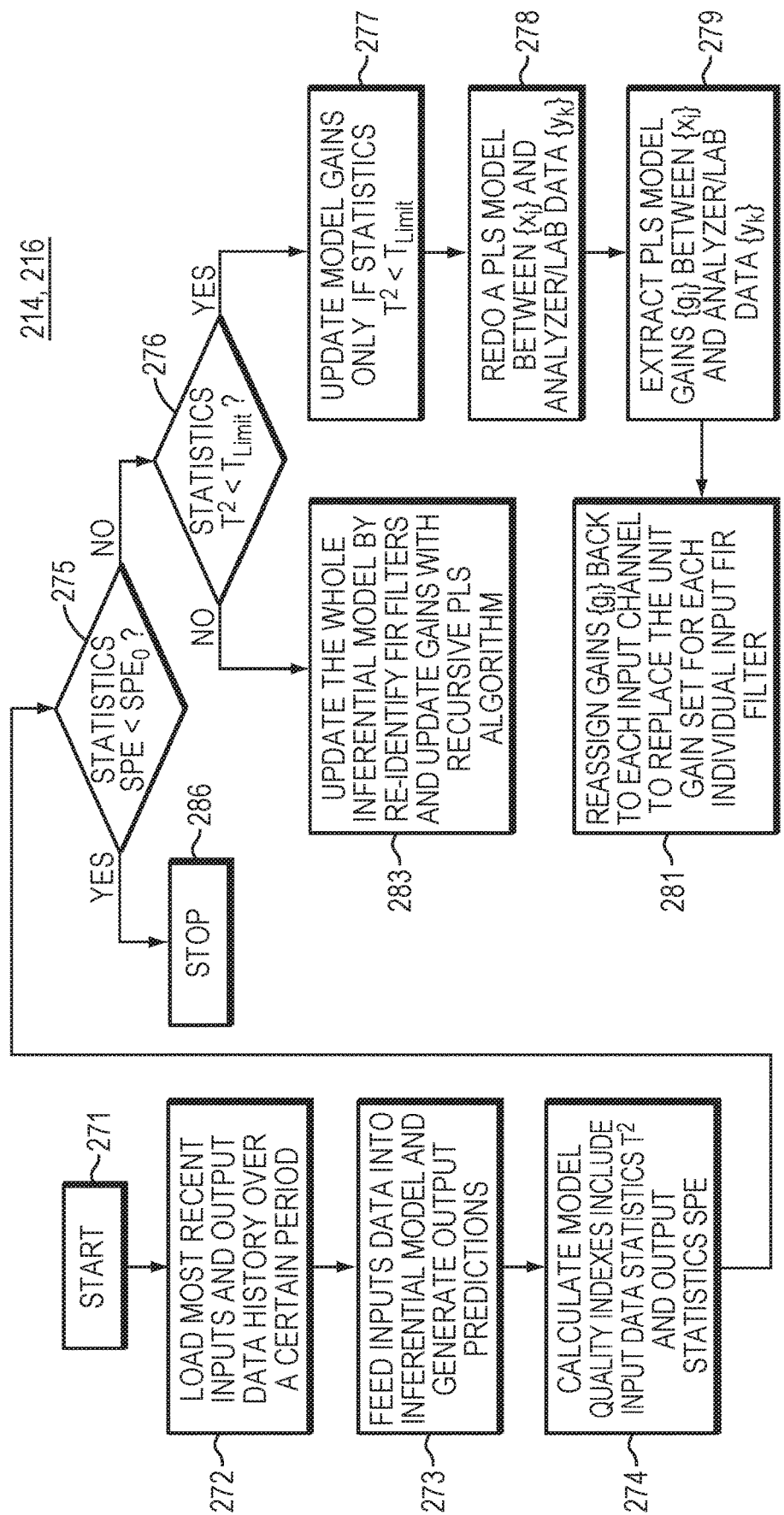
FIG. 2H is a flowchart depicting an example method of monitoring and updating a built inferential model online in the method of FIG. 2A.
Figure 2I:
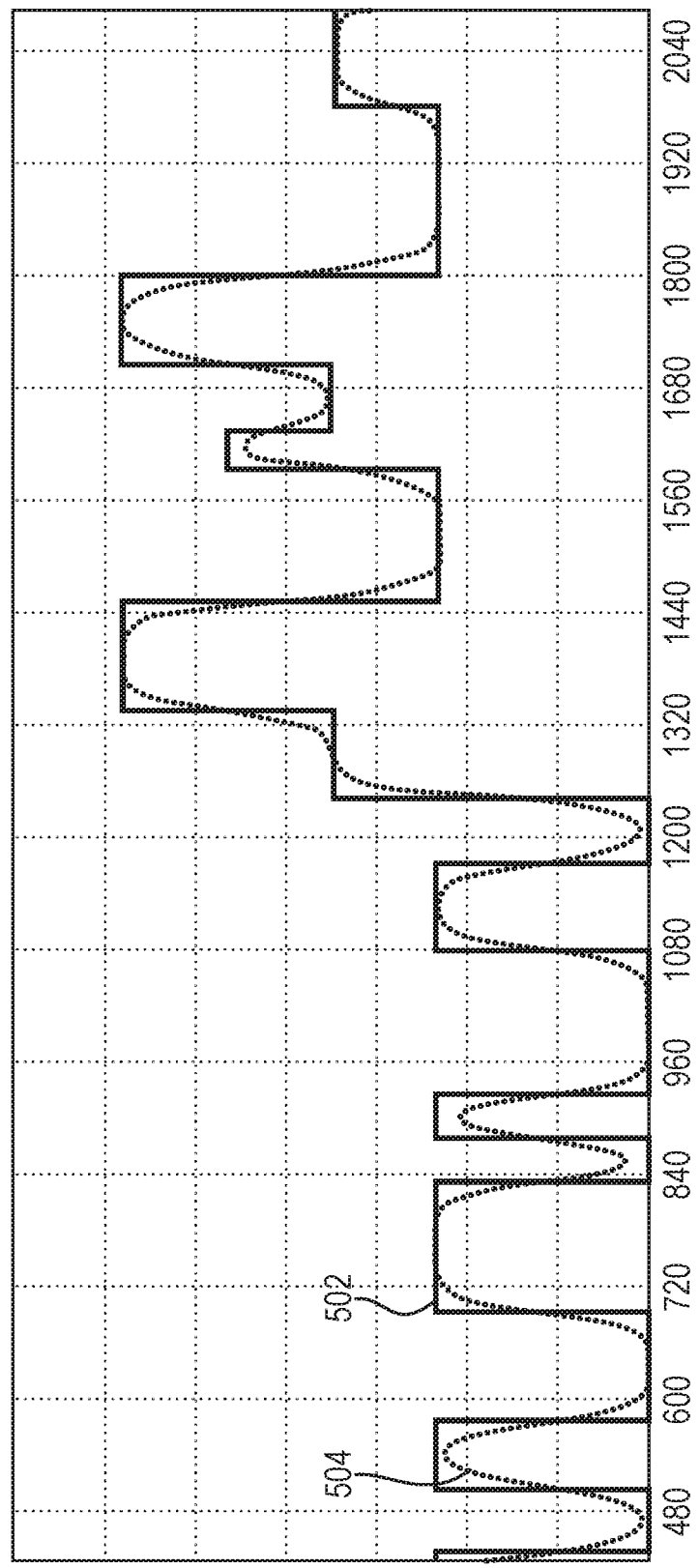
FIG. 2I is a chart depicting example non-phase-shift filtering used in the methods of FIGS. 2A and 2D.

An example method for performing steps 214 and 216 of method 200 is shown in FIG. 2H. Using the above steps (step 202-216), the method 200 not only assists process operators and engineers in building and deploying multiple predictive inferential models in an easy workflow, but also support self-monitoring and adaptation of predictive inferential models for long-term, sustained online performance in predicting product properties and KPIs of the plant process.
Method of Initializing Structure Inferential Model FIG. 2B is a flowchart depicting an example method 202 of initializing the structure of a predictive (dynamic) inferential model in embodiments of method 200 (step 202). In some embodiments, the method 202 may be performed using the example user interface screen of FIG. 3A.

The method 202 starts at step 221 and enables a user 236 to select process variables of a subject plant process to be used in the predictive inferential model. The method 202, at step 222, enables the user 236 to view and load the process variables for the subject plant process using a plant piping and instrumentation drawing (P&ID) diagram 305. The P&ID process diagram 305 includes tags corresponding to the process variables for the subject plant process (e.g., C2 Splitter Column P&ID 305 shown in left-hand side of FIG. 3A, where process tags are located near their measurement points with live measurement values). To load the process variables, the method 202, at step 224, enables the user 236 to drag and drop one or more tags from the P&ID process diagram 305 into a candidate tag list 315 (as shown in right-hand side of FIG. 3A). Each dragged/dropped tag 318 is display in the candidate tag list 315 for use in the predictive inferential model.

Alternatively, the method 202, step 223, enables the user 236 to search for tags corresponding to process variables for the subject plant process in the plant historian 111 by typing leading characters of the tag names (e.g., "FIC") into a search field 310. The tag names may be a unit name or tag group name for process variables of the subject plant process. In response, the method 202 (step 223) filters all available tags in the plant asset database 111 and only returns tags 318 matching the typed leading characters. The returned tags 318 are displayed in the candidate tag list 315. The method 202, at step 225, enables the user 236 to select some or all the returned tags 318 displayed in the candidate tag list 315 to be used in the predictive inferential model. The use of the P&ID process diagram 305 and tag-search field 310 by method 202 significantly facilitates the configuring of process variables 318 for the predictive interferential model.

The method 202, at step 226, enables the user 236 to select tags 318 in the candidate tag list 315 as an input tag 316 or output tag 317 for modeling the plant process in the predictive inferential model. Through the candidate list 315, the user 236 can select one or more tags 318 as input 316 for the predictive inferential model (e.g., by placing a check in a corresponding displayed checkboxes as shown in FIGS. 3A and 3B). Through the candidate list 315, the user 236 can only select one tag 318 as output 317 for the predictive inferential model (e.g., by placing a check in a corresponding radio box as shown in FIGS. 3A and 3B). The method 202, at step 227, enables the user 236 to optionally choose one of the tags 318 as a reference variable 320 of the predictive inferential model (as shown in FIG. 3C). The process variables 318 corresponding to the selected input tags 316, selected output tag 317, and optionally selected reference variable 320 provide the structure for building the predictive inferential model.

Method of Creating Inferential Model Dataset

FIG. 2C is a flowchart depicting an example method 204 of creating a dataset for the predictive (dynamic) inferential model in embodiments of method 200 (step 204). In some embodiments, the method 204 may be performed using the example user interface screen of FIG. 3B-3C.

The method 204 starts at step 231, and, at step 232, the method 204 creates a list of the input tags 316 and the output tag 317 selected in method 202. The method 204, at step 233, enables a user 236 to specify a time window for the historical data to be loaded from the plant asset database (or plant operational historian) 111, or to specify use of a default time window. The method 204, at step 234, loads from the plant historian (plant asset database) 111 the historical data for the process variables corresponding to the selected input tags 316 and output tag 317 and over the specified time window. The method 204, at step 234, also loads from the plant historian 111 the historical data for the reference variable corresponding to the reference variable tag 320, if selected. The loaded historical data for the input process variables 316 and reference variable 320 (if selected) are continuous measurements of the plant process. The loaded historical data for the output process variable 317 is either of output type 319: continuous measurements of the subject plant process, intermittent measurements of the subject plant process generated by an analyzer, or intermittent measurements of the subject plant process from lab analysis results (with or without use of a selected reference variable 320). The method 206 provides flexibility in building the predictive inferential model, by enabling a user 236 to choose from the different model output types 319 (as shown in FIG. 3B) to use for the output process variable 317 of the subject plant process (selected in step 202). The loaded historical data for the process variables 316, 317, 320 is the initial dataset for the predictive inferential model.

The method 204, step 235, applies data cleansing and pre-processing to the initial dataset to create a final dataset for the predictive inferential model. The method 204 (step 235) only performing the data cleansing and pre-processing on continuous measurements for the input process variables 316, output process variable 317, and reference variable 320 in the initial dataset. In example embodiments, the method 204 (step 235) applies an automated data screening and slicing technique for identifying and cleansing the generated dataset. In some embodiments, the method 204 (step 235) applies the automated data screening and slicing technique described in U.S. Pat. No. 9,141,911 B2, which is herein incorporated by reference in its entirety.

For each selected process variable 316, 317, 320 of the initial dataset, the method 204 (step 235) screens the process variable's loaded historical data (if continuous). During the screening, the method 204 (step 235) identifies segments (slices) of the data (partial and whole) that is of bad quality (invalid) for modeling the subject plant process. Each identified bad quality data segment of a process variable 316, 317, 320 may consist of a start time, end time and category type of the bad data. The method 204 (step 235) marks the identified bad quality data segments for possible exclusion from the final dataset for the predictive inferential model. The identified bad quality data segments for a process variable 316, 317, 320 includes, but are not limited to, missing samples (gaps), bad values, frozen signals (constant values crossing over the whole history), short-term outliers, and values are out of process in high/low process limits or highly noisy in the continuous historical data of the process variable 316, 317, 320. The method 204 (step 235) may identify and mark the bad quality data segments of a process variable 316, 317, 320 based on data sample status, recorded value quality, known sensor interruptions, process downtime, operational high and low limits, as well as, calculating statistics on the historical data of the process variables (as loaded from plant historian database 111 in step 234). The calculated statistics for a process variable 316, 317, 320 includes, but is not limited to, mean, median, standard deviation (STD), histogram, skewness, and kurtosis. In some embodiments, the method 204 (step 235) calculates data statistics for a process variable 316, 317, 320 after skipping all identified bad quality data segments, a percentage of data usage is calculated and presented in modeling results, as shown in FIG. 3E.

In some embodiments, the method 204 (step 235) provides flexibilities to pre-process the marked bad quality data segments of the initial dataset with several processing options to cleanse these segments. In some embodiments, the method 204 (step 235) displays the data screening results with the marked bad quality data segments of a process variable 316, 317, 320 (if any) to the user 236 via a user interface 112. The method 204 (step 235) enables the user 236 to select or confirm cleanse options and apply the selected/confirmed options to the marked bad quality data segments of the process variable 316, 317, 320. If there are no bad sections, large gaps, missing data slices, or such over the whole selected time window, the method 204 (step 235) may enable the user 236 to skip this step.

The method 204 returns a final dataset that includes cleansed historical data for the selected input process variables 316, output process variable 317, and reference variable 320. The final dataset may be used in building the predictive inferential model having the structure initialized in method 202 (FIG. 2B).

Method of Building Dynamic Inferential Model from Dataset

FIG. 2D is a flowchart depicting an example method 206 of building and training a predictive (dynamic) inferential model from a dataset in embodiments of method 200 (step 206). The method 206 builds and trains the predictive inferential model using the final dataset created by method 204.

The method 206 starts at step 241, and, at step 242, checks the model output type 319 specified for the selected output process variable (as shown in FIG. 3B). The model output type indicates the type of output measurements in the dataset for the selected output process variable 317. The model output types 319 are specified as: "continuous," "analyzer," "lab data" without reference variable, and "lab data" with reference variables. The method 206 (step 242) uses the specified model output type 319 in determining how to build and train the predictive inferential model. The output measurements (in the dataset) of the specified model output type 319 are used as output for building and training the predictive inferential model. The method 206 (step 242) may also check if a references variable 320 is specified (as also shown in FIG. 3C). Note that the method 206 (steps 241-246) uses continuous measurements in the dataset for the selected input process variables 316 and selected reference variable 320. In other embodiments, other measurement types may be used for the input process variables 316 and selected reference variable 320.

If the model output type 319 is specified as "continuous," the method 206 (step 243) builds and trains the predictive inferential model as a finite impulse response (FIR) model with a subspace identification technique (algorithm), as show in FIG. 2F. The method 206 (step 243) builds and trains the predictive inferential model using continuous output measurements (from the dataset) that are continuously measured or calculated for the selected output process variable 317 in the subject plant process. The sampling interval of the continuous output measurements is the same as that of continuous input variables measurements (e.g., approximately 1 minute per sample). The most common application of continuous model output in the process industry is applying the continuous output measurements of a process variable directly measurable or online calculable from other process variables as estimates of product properties or operational KPIs (e.g., Pressure-Compensated Temperature (PCT) and Heat-transfer efficiency of a heat-exchange system). An inferential model built and trained in this manner (accordingly to FIG. 2F), using continuous output measurements, is a high-fidelity dynamic predictive model which can be deployed online. Using this high-fidelity dynamic inferential model, KPIs values for the subject plant process can be estimated and predicted online or offline from the continuous input measurements of the subject plant process.

If the model output type is specified as "analyzer," the inferred output measurements of the selected output process variable 317 in the dataset are measured via an online analyzer (e.g., a Gas Chromatograph analyzer). The output measurements from the online analyzer are intermittent (infrequent). For example, one sample of the analyzer output measurements may be generated every 15-60 minutes, and between the samples, no continuous output measurement information for the selected output process variable 317 is available. For this type of output, method 206, at step 244, applies an interpolation operation that generates "continuous" output measurements by interpolating between the intermittent analyzer samples. That is, to generate the "continuous" output measurements, the method 206 (step 244) applies non-phase-shift filtering to interpolate measurement between the intermittent analyzer samples.

Traditionally, a "zero-order holders" technique is applied to interpolate measurements between analyzer samples and generate "continuous" measurements. The "zero-order holders" technique holds the last available sample measurement from the analyzer unchanged until a next sample measurement is received from the analyzer. As a result, the "continuous measurements" generated from interpolation using the "zero-order holder" technique look like "stair-steps," as shown by 502 in FIG. 2I. Some embodiments of the present invention may use the "zero-order holders" technique to generate the interpolated measurements. Other embodiments generate interpolated measurements between analyzer sample measurements by applying a "first-order" filter technique to the sample measurements as shown below:

$$\hat{y}(t) = e^{-\frac{1}{T}\Delta t}\hat{y}(t-1) + \left(1 - e^{-\frac{1}{T}\Delta t}\right)y(k-1), \text{ when } (k-1) < t < k \quad (1)$$

Where t is the sampling time for continuous output, k is the sampling time series for the analyzer output, $\Delta t$ is the continuous sampling interval, T is the filter time constant, and $\hat{y}(t)$ is the filtered output measurements.

The filtered interpolated measurements $\hat{y}(t)$ from the "first-order" filter technique are smoother than the interpolated measurements from the "zero-order holders" technique. As a side-effect, however, the first-order filter method generates a time-delay, or so-called "phase-shift," in the smoothed interpolated measurements in comparison to the analyzer sample measurements. To overcome the "phase-shift" side-effects, the method 206 (step 244) then applies a "no phase-shift filtering" technique to the smoothed interpolated measurements by "double-filtering" the analyzer sample data using equation (1).

To apply the "no phase-shift filtering" technique, the method 206 (step 244) first filters the sample time series for the analyzer sample measurements y(k), k=1, 2, ... N forward once as shown in equation (1). The method 206 (step 244) then filters the resulting time series $\hat{y}$ (t) backward one time using equation (1). The resulting time series $\hat{y}(t)$ from the backward filtering is even smoother than the time series resulting from the forward filtering. Further, the double-filtered measurements, as shown by 504 in FIG. 2I, no longer have a time delay because the phase-shift has been canceled by the combined forward and backward double-filtering.

In some embodiments, the method 206 (step 244) builds and trains a predictive inferential model as a FIR model using the subspace identifier technique or algorithm (as shown in FIG. 2F). In building and training the predictive inferential model, the method 206 (step 244) uses the interpolated (doubled-filtered) "continuous" measurements $\hat{y}(t)$ for the selected output process variable 317 as model output, and continuous input measurements (from the dataset) for the selected input process variables 316 as model inputs. In some embodiments, the method 206 (step 244) may also build the FIR model using the subspace identification and PLS techniques of FIG. 2G with or without interpolating the analyzer output measurements.

If the model output type 319 is specified as "lab data" without a reference variable 320 selected, the available output measurements in the dataset for the selected output process variable is "lab data" (processed through lab analysis results). The lab data is usually sampled at large time-intervals (typically between 8-48 hours depending on the subject process). The sampled output measurements in the lab data are more accurate than the output measurements from online analyzers. However, the sampled output measurements in the lab data contain less dynamic information due to the more infrequent (intermittent) sampling rate, and thus, the lab data sampled output measurements are not effective for building dynamic predictive inferential models. To address the deficiencies in the sampled output measurements in the lab data, the method 206, at step 245, builds a linear regression model with a projection latent structure (PLS) technique (algorithm) according to FIG. 2G, where all dynamic filters $U_i(q)=1$ (i=1, 2, ..., m) for method 206 (step 245). The method 206 (step 245) aligns the output measurements to input measurements of the selected input process variables 316 based on lab data timestamps, and builds and trains a steady-state inferential model from the linear regression model with the PLS technique. To build and train the steady-state inferential model, the method 206 (step 245) uses all available output measurements of the selected output process variable 317 in the lab data. Optionally, the method 206 (step 245) may filter or average the input measurements of the input process variables 316 over a time window (e.g., hourly or daily average) in order to reduce the negative impacts of input measurement noise prior to training the predictive inferential model using the input measurements.

If the model output type 319 is specified as "lab data" with a reference variable 320 selected, the method 206 (step 246) builds and trains the predictive inferential model as a hybrid FIR model with a subspace identification technique and a PLS technique. As described earlier, lab data is intermittently sampled at large time-intervals from the subject plant process and processed through lab analysis. The sampling interval of output data measurements in the lab analysis results can be between 8 to 48 hours (e.g., once a day) depending on individual applications. Such a set of intermittently sampled lab data is not sufficient to build a dynamic (predictive) inferential model. In practice, however, there are often continuously measured process variables available that are natively highly correlated with the selected output process variable (product properties) 317 contained in the lab data. For example, a temperature at top of a distillation column can be highly correlated with the product purity from the top of the column. For another example, a pressure-compensated-temperature (PCT) process variable at the top of a distillation column can be highly correlated with product quality, and is often used for quality control as a substitute of quality measurements at the column.

Based on the fact that there are continuously measured "surrogate" process variables available that are correlated with the selected output process variable (product properties), a concept of a reference variable 320 is used in embodiments. The reference variable 320 is selected as one of the continuously measured process variable correlated to the selected output process variable 317 (as shown in FIGS. 3B and 3C). The reference variable 320 can be an individual native measured process variable (e.g., a temperature) or calculated from one or more native process variables (e.g., pressure-compensated-temperature (PCT) calculated from measurements of native temperature and pressure).

The method 206 (step 246) builds and trains the predictive inferential model as a hybrid FIR model with both a subspace identification technique and a PLS technique. The method of FIG. 2E provides further details in building this hybrid FIR model. This hybrid FIR model includes components of the model structures of both FIGS. 2F and 2G. To build and train the predictive inferential model, the method 206 (step 246) uses the continuous measurements of the reference variable 320, in place of the lab data measurements for the selected output process variable 317, as model output, and uses the continuous input measurements for the selected input process variables 316 as model inputs.

The method 206 (step 246) executes the built and trained predictive inferential model (from one of steps 243-246) and the method 206 (step 247) presents results and statistics for the build inferential model.

Method of Building Hybrid Inferential Model

FIG. 2E is a flowchart depicting an example method 246 of building the predictive inferential model as a hybrid FIR model with a subspace identification technique and a PLS technique in embodiments of method 206 (step 246). The hybrid FIR model with subspace ID and a PLS technique is a hybrid of the models in FIGS. 2F and 2G. The method 246 is a new process that builds the hybrid inferential model using lab data (lab analysis results) or analyzer data, which comprise intermittent measurements for a selected output process variable 317 of a subject process.

The method 246 builds the predictive inferential model using the lab data in two major steps. The method 246, at step 251, first enables a user 236 to select a reference variable 320, which is a measurable process variable of the subject plant process, based on the user's understanding of the subject plant process. In some embodiments, the method 206 (step 246) enables a user 236 to select the reference variable 320, as shown in FIG. 3C, based on the process domain knowledge of the user 236. A good selection of reference variable 320 is: (a) a process variable physically highly correlated with the selected output process variable 317, and (b) continuously measurable or calculable from one or more other process variables (e.g., PCT at the top of a distillation column can be a good reference variable for top product quality at the column). The method 246 uses the continuous measurements of the selected reference variable 320, in place of the intermittent lab data measurements for the selected output process variable 317.

The method 246 (steps 252-257) then builds the initial hybrid FIR model using the continuous measurements of the selected input process variables 316 and selected reference variable 320. The method 246, at step 252, builds (identifies) a dynamic state-space model between the selected input process variables 316 and the selected reference variable 320. The method 246 (step 252) uses the continuous measurements of the select input variables 316 as inputs and the continuous measurements of the selected reference variable 320 as output. The method 246 (step 252) applies a so-called subspace identification technique and the resulting model is a state-space model. Example subspace identification techniques are described in: "Improved Closed-loop Subspace Identification Technology for Adaptive Modeling and APC Sustained Value," AIChE Spring Meeting, Apr. 1-5, 2012; "Identification of Chemical Processes using Canonical Variate Analysis," Computers & Chemical Engineering, Vol. 18, No. 1, pages 55-69; and "System Identification: Theory for the User," 2nd Edition, Prentice Hall PTR, Chapters 10.6-10.8, pages 340-353, which are all incorporated by reference in their entirety.

The method 246, at step 253, converts the identified state-space model into a set of FIR filters (i.e., a continuous FIR model similar to FIG. 2F). Each FIR filter (or sub-model) corresponds to the input channel $U_i(t)$ 258, 261, 264 of a given selected input process variable 316, and filters the measurements for a given selected input process variable 316. The method 246, at step 253, converts all dynamic filters $G_i(q)$ 260, 263, 266 of FIG. 2F into $U_i(q)$ with unit-gain 284, 291, 295 of FIG. 2G. To do so, the method 246, at step 253, may keep the dynamic portion of the continuous FIR model and drops the initial FIR model's steady-state gains in g 260, 263, 266 of FIG. 2G for each input channel $u_i(t)$ 258, 261, 264 by resetting the FIR model steady-state gains in g 260, 263, 266 into unit-gain (i.e., $k_i$=1) for each FIR filter, and resulted in $U_i(q)$ 284, 291, 295 in FIG. 2G.

The method 246, at step 254, feeds input (input time series data) for the selected input process variables into the set of unit-gain FIR filters 284, 291, 295 in FIG. 2G (via the respective input channels $U_i(t)$ 258, 261, 264) and generates filtered signals (time series) $x_i(t)$ 282, 289, 293 for the selected input process variables 316. The method 246, at step 255, builds (fits) a PLS model 280 of FIG. 2G between the filtered signals $x_i(t)$ 282, 289, 293 as input and the lab data y(k) 298 of FIG. 2G as output data to build a steady-state linear regression model using a PLS technique, as described above in reference to method 206 (step 245). Optionally, a first-order model with a time delay can be further apply to the PLS model between the filtered signals $x_i(t)$ 282, 289, 293 for the selected input process variables 316 and the lab data y(k) 298 of FIG. 2G, as a common path for all selected input process variables 316 to catch any time delay between the reference variable measurements and lab data y(k) 298.

The method 246, at step 256, extracts PLS linear regression model gains $k_i$ 285, 292, 296 between the filtered signals $x_i(t)$ 282, 289, 293 and the lab data y(k) 298. Each extracted PLS model gain $k_i$ 285, 292, 296 corresponds to an input process variable 216. The method 246, at step 257, reassigns each PLS model gain $k_i$ 285, 292, 296 back to the input channel filters $U_i(q)$ 284, 291, 295 in FIG. 2G for input $u_i(t)$ 258, 261, 264 of the corresponding input process variable 316. For each FIR filter, the PLS model gain $k_i$ 285, 292, 296 is used to replace the unit gains (of step 253) for the FIR filter. The method 246 (step 257) re-assembles a hybrid (dynamic) predictive inferential model by combining the unit-gain FIR filters $U_i(q)$ 284, 291, 296 with the built steady-state linear regression model 280 (i.e. re-setting each unit-gain FIR filter with an identified corresponding model gain $k_i$ 285, 292, 296 from the steady-state regression model of FIG. 2G). By applying $k_i$ 285, 292, 296 to the unit-gain FIR filters $U_i(q)$ 284, 291, 295 in FIG. 2G, the predictive inferential models are built as a dynamic FIR model, which is able to estimate current estimates and predict future product properties or KPIs for the subject plant process by feeding from the short history of at least one measured input process variable.

Building Inferential Model Using FIR/Subspace

FIG. 2F is a block diagram depicting an example multiple-input single-output (MISO) FIR model built with a subspace identification technique. In embodiments, a predictive dynamic inferential model is built as this MISO FIR model. For example, this MISO FIR model structure may be used in steps 243 and 244 of FIG. 2D to build and train the predictive inferential model using continuous output measurements. Note in the case of step 244 of 2D (intermittent analyzer measurements for the selected output process variable), a non-phase-shift filtering is first applied to the analyzer measurements to generate "continuous" measurements via interpolation prior to building and training the predictive inferential modeling using this MISO FIR model. Further details of the interpolation of analyzer measurements is described above in reference to step 244 of method 206 in FIG. 2D.

The MISO FIR model of FIG. 2F illustrates the general model structure of an inferential model built and trained with continuous output measurements. Mathematically, a soft-sensor or inferential model can be described in following equations:

$$y(t) = \sum_{i=1}^{m} f_i(u_i(t - \tau_i), \theta_i) + v_i(t) \quad (2)$$

Where $u_1, u_2 \ldots u_m$ are input variables, $r_i$ is time-delay in the ith input channel, $\theta_i$ is model parameters, and $v_i(t)$ is unknown disturbances or noise.

Equivalently, equation (2) can be also re-written in so-called frequency-domain or Laplace transform as following:

$$y(s) = \sum_{i=1}^{m} G_i(s) e^{-\tau_i s} = \sum_{i=1}^{m} K_i * g_i(s) * e^{-\tau_i s} \quad (3)$$

Where i=1, 2, . . . , m; represents the ith input channel, $r_i$ is time delay for the ith input channel, $K_i$ and $g_i(s)$ are steady-state gain and dynamic filter for the ith input channel, respectively.

To obtain an optimal predictive inferential model, the embodiment applies a so-called "subspace identification" technique and a special technique as described in U.S. Pat. No. 9,727,035 B2, which is herein incorporated by reference in its entirety. Example subspace identification techniques are described in: "Improved closed-loop subspace identification technology for adaptive modeling and APC sustained value," AIChE Spring Meeting, Apr. 1-5, 2012; "Identification of Chemical Processes using Canonical Variate Analysis," Computers & Chemical Engineering, Vol. 18, No. 1, pages 55-69; and "System Identification: Theory for the User," 2nd Edition, Prentice Hall PTR, Chapters 10.6-10.8, pages 340-353, which are all incorporated by reference in their entirety. The resulted model is called a multi-inputs, single-output (MISO) dynamic state-space model. To facilitate online applications, the identified MISO model is further converted into a set of so-called finite-impulse response (FIR) filters (sub-models) as shown in FIG. 2F and equation (3), and each FIR filter has its own model gain and dynamics $g_i(q)$ (i=1, 2, . . . , m).

A MISO FIR model includes the set time-delay units DT, 259, 262, 265 and a set of linear (or nonlinear) filters $G_i(q)$ 260, 263, 266. The output estimations y(t) 270 of the MISO FIR model is calculated as a summation 267 of values $x_i(t)$ 282, 289, 293 at time t from all input channels $U_i(t)$ 258, 261, 264 (corresponding to selected input process variables $u_1, u_2, \ldots, u_m$)

The MISO model takes in continuous measurements for the selected input process variables ($u_1, u_2, \ldots, u_m$) at the input channels $U_i(t)$ 258, 261, 264 of each sub-model of the FIR model. The continuous measurements for each selected input process variables 258, 261, 264 are provided to the time-delay units DT, 259, 262, 265 of the respective sub-model followed by a linear (or nonlinear) filters $G_i(q)$ 260, 263, 266 of the respective sub-model, which generate values $x_i(t)$ 282, 289, 293. The values $x_i(t)$ 282, 289, 293 at time t are summed 267 and assumed unknown disturbances or noise $v_i(t)$ 269 is included in the output measurements of y(t) 270 of an output process variable.

Because of the MISO FIR format, the predictive inferential model is a dynamic model (different from most steady-state regression soft-sensors) and is capable of generating dynamic predictions of the future using current continuous input measurements and historical input measurements. For example, at current time t, the output predictions in the future are represented by (t+F), and can be calculated from the following equation:

$$\hat{y}(t+F) = \sum_{i=1}^{m} \varphi_i(t + F - \tau_i - 1)\hat{\theta}_i + \text{bias}(t) \quad (4)$$

$$\text{bias}(t+1) = (1 - \alpha)\text{bias}(t) + \alpha[y(k) - \hat{y}(t)] \quad (5)$$

Where $\varphi_i(t+F-\tau_i-1) = [u_i(t+F-\tau-1), u_i(t+F-\tau-2), \ldots, u_i(t+F-\tau-n)]^T$ are FIR model input values for each input channel, with $\hat{\theta}_i = [a_{i1}, a_{i2}, \ldots a_{in}]$, a parameter vector of FIR model coefficients. Equation (5) is a recursive prediction bias update scheme, and the bias(t) is an offset (a correction item on model predictions) to compensate online model mismatches due to unknown process disturbances and process shifts. The parameter value of α is between 0~1 (i.e. 0<α<1.0), and an editable default value is set α=0.9 and named "Lab Bias Fraction" as shown in FIG. 3D.

Note: in generating future predictions of inferred product qualities ŷ(t+F), some of the input values in the future $u_i(t+F-j)$, may not be available. Instead, an assumption may be made that the input beyond current time moving into future holds the latest (current) measured input values and are unchanged. In practice, it is a reasonable assumption for most dynamic processes, such as a manipulated control input, that measured input values can be held unchanged while waiting to see the future response of an inferred process property. In addition, the built inferential model performs prediction bias updates using Equations (4) and (5) to correct the current and future dynamic predictions by modifying prediction offset slowly.

Building Inferential Model Using FIR/Subspace/PLS

FIG. 2G is a block diagram depicting another example multiple input single output (MISO) method used in building an inferential model in embodiments of method 200 (step 206). For example, this MISO model may be used in steps 244-246 of FIG. 2D to build and train the predictive inferential model using analyzer or lab data, respectively.

FIG. 2G illustrates a specific model structure of the predictive inferential for building and training a model using lab data (or analyzer data). Note that in FIG. 2G, output measurements y(k) 298 (e.g., product properties) represent intermittent output measurements sampled at a specific time t k from the intermittent lab data (rather than from continuous output measurements). For these output measurements, the sampling interval is usually between 8 to 48 hours, depending on individual applications of lab analysis. Traditionally, only a steady-state type of inferential model with very low resolution and without predictive capability can be built from lab data measurements as output.

The MISO FIR/PLS model of FIG. 2G takes in continuous measurements of the selected input process variables $(u_1, U_2, \ldots, u_m)$ from the input channels $U_i(t)$ 258, 261, 264 to each sub-model of the FIR/PLS model. The continuous measurements for each selected input process variables $(u_1, u_2, \ldots, u_m)$ are provided to a time-delay unit DT, 259, 262, 265 of the respective sub-model followed by a linear (or nonlinear) filter $U_i(q)$ with unit-gain 284, 291, 295 of the respective sub-model, which generates values $x_i(t)$ 282, 289, 293. The resulting values $x_i(t)$ 282, 289, 293 at time t are each provided to a PLS steady-state linear regression model 280, multiplied with gains $k_i$ 285, 292, 296, summed 267, and included 299 for unknown disturbances or noise to generate output estimates y(k) 298 of a output process variable (or reference variable).

In embodiments using lab data without a reference variable, in the MISO model, the output measurement y(k) 298 of the selected output variable are aligned (for linear regression) to input measurements $u_1, u_2, \ldots, u_m$ of the selected input process variables based on lab data timestamps. In the MISO model, the static PLS steady-state linear regression model gains $k_i$ 285, 292, 296 are fitted to create an optimal static relationship between the output measurements y(k) 298 and the input measurements $\{u_1, u_2, \ldots, u_m\}$.

In embodiments using lab data with a reference variable, a hybrid model can be built (from the MISO FIR models of FIGS. 2F and 2G) as the predictive inferential model. In some embodiments, the hybrid model may be built according to the steps of method 246 in FIG. 2E. To build the hybrid model, the user 236 specifies a reference variable 320 based on the user's process domain knowledge. The selected reference variable 320 is a continuous measurable process variable, available from the input process variables 316 for the process, and highly correlated to lab data for the selected output process variable 317. As shown in the user interface screen of FIG. 3C, a preliminary dynamic inferential model is built between the continuous measurements for the selected input process variables 316 (as inputs) and the continuous measurements for the selected reference variable 320 measurements (as output). The preliminary model has a structure shown in FIG. 2F and a format defined by equation (3).

From the preliminary model, the dynamic portion of the FIR model are kept and all dynamic filters $G_i(q)$ 260, 263, 266 of FIG. 2F are converted into $U_i(q)$ with unit-gain 284, 291, 295 of FIG. 2G. The input data $U_i(t)$ 258, 261, 264 is next fed into model FIG. 2G, which generates a corresponding time series $x_i(t)$ 282, 289, 293 as shown in FIG. 2G. A PLS regression model is then built between the filtered and dynamically aligned intermediate variables $x_i(t=k)$ 282, 289, 293 and the lab data measurements y(k) 298 of FIG. 2G. Note that k represents a set of discrete samples (e.g., one sample per 24 hours), while t is a continuous sampling time (e.g., a sample per minute). A hybrid (dynamic part of FIG. 2F+PLS part of FIG. 2G) model is built and trained by combining unit-gain FIR filters $U_i(q)$ 284, 291, 295 with steady-state linear regression model gains ki 285, 292, 296 in the form as shown in FIG. 2G and equation (3). The built and trained hybrid model may be deployed for generating current estimates and future predictions of a product quality or a KPI from the subject plant process online.

Method of Monitoring and Updating Inferential Model Online

FIG. 2H is a flowchart depicting an example method 214, 216 for updating a hybrid inferential model online in embodiments of method 200 (steps 214 and 216). In embodiments, the method 214 uses the predictive inferential model built and trained in step 206 of method 200, using input and output process variables 316, 317 selected in step 202 of method 200 for the predictive inferential model.

The method 214 starts at step 271, and, at step 272, loads the most recent measurements for the input and output process variables of the predictive inferential from the data history (plant historian 111) over a certain period. The certain period may be selected by a user 236 via a user interface 112 or be set as a default value. The method 214, at step 273, feeds the loaded recent measurements of the input process variables (inputs data) into the predictive inferential model and the predictive inferential model generates output predictions (for the output process variable 317). Using the loaded recent measurements, the method 214, step 274, calculates model quality indexes (PLS model statistics), including input data statistics $T^2$ (e.g., Hotelling $T^2$) and output statistics squared prediction error (SPE). The method 214, at step 275, checks the deployed predictive model for confidence thresholds by determining if the statistics SPE is less than (below) the confidence threshold $SPE_0$. If the statistics SPE is below the confidence threshold $SPE_0$, the method 214, at step 286, stops. Otherwise if the statistics SPE is not below the confidence threshold $SPE_0$, the method 214, at step 276, determines if the statistics $T^2$ is less than (below) the confidence threshold $T_{Limit}$.

If the statistics $T^2$ is not below the confidence threshold $T_{Limit}$, the model quality is detected as degraded severely. The method 214, at step 283, thus updates the entire predictive inferential model by re-identifying the FIR filters and updating the PLS model gains $k_i$ 285, 292, 296 with recursive PLS techniques. Otherwise, if the statistics $T^2$ is below the confidence threshold $T_{Limit}$, the method 214 proceeds to step 277. If the statistics $T^2$ is below or within the confidence limit threshold $T_{Limit}$, this means the correlation structure of inputs does not change much, and then the method 214 (step 277) only updates the PLS model gains $k_i$ 285, 292, 296 in the FIR model defining the predictive inferential model. The method 214, at step 278, then rebuilds a PLS model 280 between filtered signals $x_i(t)$ 282, 289, 293 and analyzer/lab data y(k) 298. The method 214, at step 279, extracts the PLS model gains $k_i$ 285, 292, 296 between the filtered signals $x_i(t)$ 282, 289, 293 and the lab data y(k) 298. The method, at step 281, then reassigns the PLS model gains $k_i$ 285, 292, 296 back to each input channel $U_i(t)$ 258, 261, 264 to replace the unit gains set earlier for each individual input FIR filter 284, 291, 295.

User Interface Screens

FIGS. 3A-3E illustrate example user interface screens used to build and deploy a predictive inferential model. FIG. 3A is an example user interface screen used to initialize the structure of a predictive inferential model (step 202 of FIGS. 2A and 2B) for a subject C2 splitter column process. In FIG. 3A, a user 236 selects process variables of the subject C2 splitter column process for the predictive inferential model. To do so, the user 236 performs a tag search for available process variables in the C2S graphic group (e.g., by typing the characters "V01" in field 310) for initializing the structure of the predictive inferential model. FIG. 3A presents all tags returned from the search in a displayed tag candidate list 315. In other embodiments, the user 236 may drag and drop tags from the P&ID diagram 305 into the tag candidate list 315. In FIG. 3A, the user 236 selects tags V01-PD-8701, V01-FI-8701, V01-TI-8701, V01-T1-8703 V01-TI-8704 and V01-TI-8705 from the tag candidate list 315 as input 316 and tag V01-TI8702A as output 317 in building and training the predictive inferential model. Once selected, the user 236 clicks the "Create Model" button to initiate building of the predictive inferential model.

FIG. 3B is an example user interface screen used to select a model output type 319 specifying the output measurements to be used in the dataset for the selected process output variable 317. The model output types 319 include lab (with or without a selected reference variable 318), analyzer, and continuous. The model output type of 319 of lab indicates that the measurements for the selected output process variable are from lab analysis results. If a reference variable 320 is also selected with the model output type 319 of lab, then the measurements for process variable selected as the reference variable 320 are used in place of the measurements for the selected output process variable 317. The reference variable 320 is selected because it highly correlates to the selected output process variable 317. FIG. 3C is an example user interface screen showing the selection of reference variable 320 for an output process variable of model output type lab 319.

FIG. 3D is an example user interface screen for performing input validation of a built inferential model (step 208 of FIG. 2A). A 236 user may execute the input validation techniques to check the validity of one or more input process variables by selecting their respective tags and type in their Hi/Lo limit values for online validation. FIG. 3E is an example user interface screen for examining (viewing) results and analytics for a built inferential model (step 210 of FIG. 2A). The results provided for viewing including sensitivity of selected input process variables, the fit and comparison of the model measurements versus the model predictions, the steady-state model equation, and data usage, gain and coefficients for the selected process variables. FIG. 3F is a user interface screen showing output (dynamic inferential predictions) generated by the online deployment of the built and trained inferential model (step 212 of FIG. 2A).

Digital Process Environment

Figure 4:
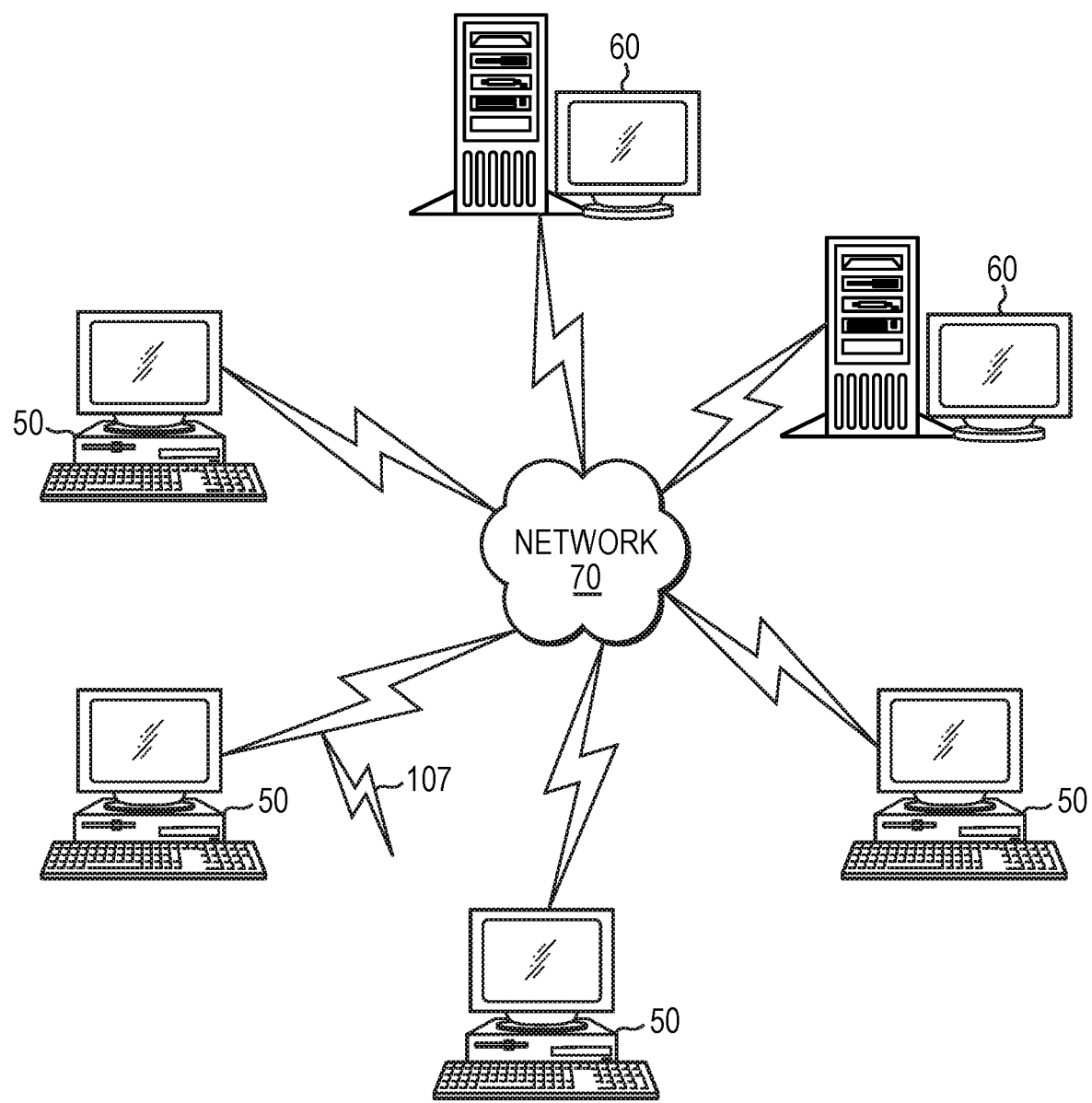
FIG. 4 is a schematic view of a computer network in which embodiments may be implemented.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 5:
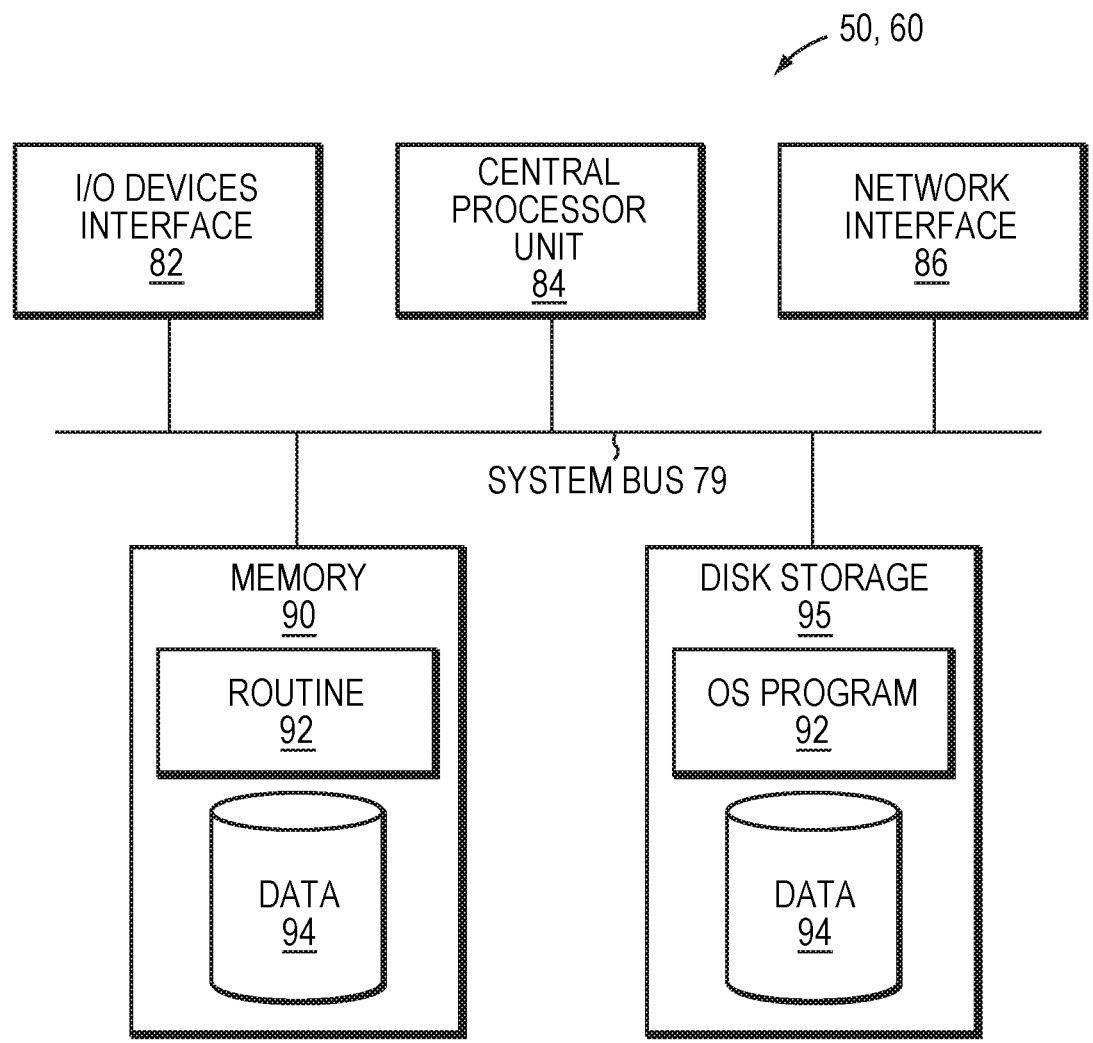
FIG. 5 is a block diagram of a computer node in the network of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., a predictive analyzer including model builder and deployment engine and user interfaces detailed in FIGS. 1 and 3A-3F, and working procedure code 200 to implement the methods of FIGS. 2A-2I). Disk storage 95 provides non-volatile storage for computer software instructions 92 and data 94 used to implement an embodiment of the present invention. Data 94 may include the components of the inferential model, MISO models, PLS models, FIR filters, unit gains, input/output process variables and associated tags, reference variable, measurements of the input/output process variables, measurements of the reference variables, and so forth as previously discussed. Central processor unit 84 is also attached to system bus 79 and provides for the execution of computer instructions (including executing calculations, such as a PLS technique, auto-data-slicing technique, FIR filters, state-space technique, correlation analysis technique, non-phase-shift filtering techniques, equations (1)-(4) and such to build a predictive inferential model).

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so-called Software as a Service (SaaS), or other installation or communication supporting end-users.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for predicting behavior of an industrial process, the method comprising:
    initializing an inferential model of a subject industrial process, the initializing: (i) selects process variables of the subject industrial process, (ii) configures one or more of the selected process variables as one or more input process variables that represents input of the inferential model; and (iii) configures one of the selected process variables as an output process variable that represents output of the inferential model;
    loading measurements for the selected process variables, wherein the loaded measurements for the configured output process variable are of a particular model output type including (i) lab data with a reference variable, (ii) continuous, (iii) analyzer, or (iv) lab data, wherein the reference variable is a process variable of the subject industrial process, the reference variable correlates to the configured output process variable in the subject industrial process;
    based on the particular model output type of the loaded measurements, determining a model structure representing the inferential model;
    using the loaded measurements, building and training the inferential model according to the determined model structure; and
    deploying the built and trained inferential model online, the deployed inferential model continuously generating key performance indicators (KPIs) that estimate current behavior of the subject industrial process and predict further behavior of the subject industrial process;
    wherein when the particular model output type is lab data with the reference variable:
        the loaded measurements for the configured output process variable are intermittent samples from lab analysis of the subject industrial process;
        the determined model structure is a hybrid finite impulse response (FIR) model with a subspace identification technique and a projection latent structure (PLS) technique; and
        using continuous measurements for the reference variable, the inferential model is built and trained as the hybrid FIR model with the subspace identification technique and the PLS technique.

2. The computer-implemented method of claim 1, wherein selecting the process variables comprises:
    through a user interface, a user:
        at least one of:
            dragging and dropping tags corresponding to the process variables from a plant piping and instrumentation drawing (P&ID) diagram into a candidate process variable list, and
            searching for tags corresponding to the process variables in a plant historian, the searched tags being placed in the candidate process variable list; and
        configuring a subset of tags in the candidate process variable list as input of the inferential model, and configuring one tag as output of the inferential model.

3. The computer-implemented method of claim 1, further comprising:
    loading measurements for the selected process variables from a plant historian; and
    performing data screening on the loaded measurements, the data screening identifying and cleansing bad data segments from the loaded measurements, the bad data segments including at least one of: missing data samples, bad values, short term outliers, values at high or low process limits, and frozen signals.

4. The computer-implemented method of claim 1, wherein when the particular model output type is continuous:
    the loaded measurements for the configured output process variable are continuous measurements collected from the subject industrial process;
    the determined model structure is a FIR model with a subspace identification technique; and
    using the continuous measurements, the inferential model is built and trained as the FIR model with the subspace identification technique.

5. The computer-implemented method of claim 1, wherein when the particular model output type is analyzer:
    the loaded measurements for the configured output process variable are intermittent samples generated by an analyzer, the analyzer generates the intermittent samples by analyzing online the subject industrial process;
    the intermittent samples are converted into continuous measurements by applying non-phase-shift filtering, the applied non-phase shift filtering interpolates measurement between the intermittent samples;
    the determined model structure is a FIR model with a subspace identification technique; and using the converted continuous measurements, the inferential model is built and trained as the FIR model with the subspace identification technique.

6. The computer-implemented method of claim 1, wherein when the particular model output type is lab data:
the loaded measurements for the configured output process variable are intermittent samples from lab analysis of the subject industrial process;
the determined model structure is a linear regression model with a PLS technique; and
using the intermittent samples, the inferential model is built and trained as the linear regression model with the PLS technique.

7. The computer-implemented method of claim 1, further comprising a recursive bias update scheme executed by:
updating prediction bias using the inferential model based on the calculated current KPIs, the updated prediction bias being applied to correct the KPI predictions of the subject industrial process; and
generating current and future, continuous, bias-compensated process KPI prediction values of the subject industrial process.

8. The computer-implemented method of claim 1, further comprising:
monitoring the deployed inferential model online, the monitoring detects performance degradation of the deployed inferential model in predicting the behavior of the subject industrial process; and
if performance degradation is detected, updating the deployed inferential model according to the determined model structure.

9. The computer-implemented method of claim 8, wherein the monitoring of the deployed inferential model online further comprising:
loading recent measurements for the selected process variables;
calculating PLS model statistics from the loaded recent measurements, the PLS model statistics including at least one of Hotelling $T^2$ statistics and output statistics squared prediction error (SPE);
comparing the calculated PLS model statistics to confidence thresholds; and
if the calculated PLS model statistics do not meet the confidence thresholds, detecting a performance degradation of the deployed inferential model.

10. A computer system for predicting behavior of an industrial process, the computer system comprising:
a processor; and
a memory with computer code instructions stored thereon, the memory operatively coupled to the processor such that, when executed by the processor, the computer code instructions cause the computer system to implement:
(a) a model builder configured to:
initialize an inferential model of a subject industrial process, the initializing: (i) selects process variables for the subject industrial process, (ii) configures one or more of the selected process variables as one or more input process variables that represents input of the inferential model; and (iii) configures one of the selected process variables as an output process variable that represents output of the inferential model;
load measurements for the selected process variables, wherein the loaded measurements for the configured output process variable are of a particular model output type including (i) lab data with a reference variable, (ii) continuous, (iii) analyzer, or (iv) lab data, wherein the reference variable is a process variable of the subject industrial process, the reference variable correlates to the configured output process variable in the subject industrial process;
based on the particular model output type of the loaded measurements, determine a model structure representing the inferential model; and
using the loaded measurements, build and train the inferential model according to the determined model structure; and
(b) a deployment engine configured to:
deploy the built and trained inferential model online, the deployed inferential model continuously generating key performance indicators (KPIs) that estimate current behavior of the subject industrial process and predict further behavior of the subject industrial process;
wherein when the particular model output type is lab data with the reference variable:
the loaded measurements for the configured output process variable are intermittent samples from lab analysis of the subject industrial process;
the determined model structure is a hybrid finite impulse response (FIR) model with a subspace identification technique and a projection latent structure (PLS) technique; and
using continuous measurements for the reference variable, the model builder is configured to build and train the inferential model as the hybrid FIR model with the subspace identification technique and the PLS technique.

11. The computer system of claim 10, wherein selecting the process variables comprises:
through a user interface, a user:
at least one of:
dragging and dropping tags corresponding to the process variables from a plant piping and instrumentation drawing (P&ID) diagram into a candidate process variable list, and
searching for tags corresponding to the process variables in a plant historian, the searched tags being placed in the candidate process variable list; and
configuring a subset of tags in the candidate process variable list as input of the inferential model, and configuring one tag as output of the inferential model.

12. The computer system of claim 10, wherein the model builder is further configured to:
perform data screening on the loaded measurements, the data screening identifying and cleansing bad data segments from the loaded measurements, the bad data segments including at least one of: missing data samples, bad values, short term outliers, values at high or low process limits, and frozen signals.

13. The computer system of claim 10, wherein when the particular model output type is continuous:
the loaded measurements for the configured output process variable are continuous measurements collected from the subject industrial process;
the determined model structure is a FIR model with a subspace identification technique; and
using the continuous measurements, the model builder is configured to build and train the inferential model as the FIR model with the subspace identification technique.

14. The computer system of claim 10, wherein the particular model output type is analyzer:

the loaded measurements for the configured output process variable are intermittent samples generated by an analyzer, the analyzer generates the intermittent samples by analyzing online the subject industrial process;

the intermittent samples are converted into continuous measurements by applying non-phase-shift filtering, the applied non-phase-shift filtering interpolates measurement between the intermittent samples;

the determined model structure is a FIR model with a subspace identification technique; and using the converted continuous measurements, the model builder is configured to build and train the inferential model as the FIR model with the subspace identification technique.

15. The computer system of claim 10, wherein when the particular model output type is lab data:

the loaded measurements for the configured output process variable are intermittent samples from lab analysis of the subject industrial process;

the determined model structure is a linear regression model with a PLS technique; and using the intermittent samples, the model builder is configured to build and train the inferential model as the linear regression model with the PLS technique.

16. The computer system of claim 10, wherein the deployment engine is further configured to execute a recursive bias update scheme by:

updating prediction bias using the inferential model based on the calculated current KPIs, the updated prediction bias being applied to correct the KPI predictions of the subject industrial process; and generating current and future, continuous, bias-compensated process KPI prediction values of the subject industrial process.

17. The computer system of claim 10, wherein the deployment engine is further configured to:

monitor the deployed inferential model online, the monitoring detects performance degradation of the deployed inferential model in predicting the behavior of the subject industrial process; and if performance degradation is detected, update the deployed inferential model according to the determined model structure.

18. The computer system of claim 10, wherein the deployment engine is further configured to monitor the deployed inferential model online by:

loading recent measurements for the selected process variables;

calculating PLS model statistics from the loaded recent measurements, the PLS model statistics including at least one of Hotelling $T^2$ statistics and output statistics squared prediction error (SPE);

comparing the calculated PLS model statistics to confidence thresholds; and if the calculated PLS model statistics do not meet the confidence thresholds, detecting a performance degradation of the deployed inferential model.

19. A computer program product comprising:

a non-transitory computer-readable storage medium having computer code instructions stored thereon, the storage medium operatively coupled to a processor, such that, when executed by the processor for predicting behavior of an industrial process, the computer code instructions cause the processor to:

initialize an inferential model of a subject industrial process, the initializing: (i) selects process variables for the subject industrial process, (ii) configures one or more of the selected process variables as one or more input process variables that represents input of the inferential model; and (iii) configures one of the selected process variables as an output process variable that represents output of the inferential model;

load measurements for the selected process variables, wherein the loaded measurements for the configured output process variable are of a particular model output type including (i) lab data with a reference variable, (ii) continuous, (iii) analyzer, or (iv) lab data, wherein the reference variable is a process variable of the subject industrial process, the reference variable correlates to the configured output process variable in the subject industrial process;

based on the particular model output type of the loaded measurements, determine a model structure representing the inferential model;

using the loaded measurements, build and train the inferential model according to the determined model structure; and deploy the built and trained inferential model online, the deployed inferential model continuously generating key performance indicators (KPIs) that estimate current behavior of the subject industrial process and predict further behavior of the subject industrial process;

wherein when the particular model output type is lab data with the reference variable:

the loaded measurements for the configured output process variable are intermittent samples from lab analysis of the subject industrial process;

the determined model structure is a hybrid finite impulse response (FIR) model with a subspace identification technique and a projection latent structure (PLS) technique; and using continuous measurements for the reference variable, the model builder is configured to build and train the inferential model as the hybrid FIR model with the subspace identification technique and the PLS technique.

* * * * *